(12) United States Patent
Kang et al.

(10) Patent No.: US 9,008,732 B2
(45) Date of Patent: Apr. 14, 2015

(54) MOBILE COMMUNICATION TERMINAL AND METHOD FOR OPERATING THE SAME

(75) Inventors: Minhun Kang, Seoul (KR); Raehoon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 13/495,847

(22) Filed: Jun. 13, 2012

(65) Prior Publication Data

US 2012/0329527 A1 Dec. 27, 2012

(30) Foreign Application Priority Data

Jun. 22, 2011 (KR) ........................ 10-2011-0060832

(51) Int. Cl.
| | |
|---|---|
| H04M 1/00 | (2006.01) |
| H04N 13/04 | (2006.01) |
| H04N 13/00 | (2006.01) |
| H04N 21/2381 | (2011.01) |
| H04N 21/414 | (2011.01) |
| H04N 21/47 | (2011.01) |
| H04N 21/472 | (2011.01) |
| H04N 21/61 | (2011.01) |
| H04N 21/63 | (2011.01) |
| H04N 21/81 | (2011.01) |

(52) U.S. Cl.
CPC ....... H04N 13/0452 (2013.01); H04N 13/0059 (2013.01); H04N 21/2381 (2013.01); H04N 21/41407 (2013.01); H04N 21/47 (2013.01); H04N 21/472 (2013.01); H04N 21/6131 (2013.01); H04N 21/631 (2013.01); H04N 21/816 (2013.01)

(58) Field of Classification Search
USPC ........................................................ 455/566
See application file for complete search history.

(56) References Cited

U.S. PATENT DOCUMENTS

| | | | | |
|---|---|---|---|---|
| 2007/0130543 | A1* | 6/2007 | Lee et al. ....................... | 715/810 |
| 2007/0147794 | A1* | 6/2007 | Araki ............................. | 386/125 |
| 2007/0287498 | A1* | 12/2007 | Wang et al. ................ | 455/556.1 |
| 2008/0303832 | A1* | 12/2008 | Kim et al. ..................... | 345/501 |
| 2009/0153389 | A1* | 6/2009 | Kerr et al. ..................... | 341/176 |
| 2009/0262707 | A1* | 10/2009 | Wu et al. ....................... | 370/332 |
| 2010/0150245 | A1* | 6/2010 | Camp et al. ............. | 375/240.25 |
| 2010/0265917 | A1* | 10/2010 | Kezys et al. .................. | 370/331 |
| 2010/0295958 | A1* | 11/2010 | Larsson et al. ............. | 348/222.1 |
| 2012/0147854 | A1* | 6/2012 | Jalil et al. ..................... | 370/331 |

FOREIGN PATENT DOCUMENTS

| | | |
|---|---|---|
| JP | 2010-239562 | 10/2010 |
| KR | 10-2010-0133351 | 12/2010 |

* cited by examiner

*Primary Examiner* — Lester Kincaid
*Assistant Examiner* — Andy Gu
(74) *Attorney, Agent, or Firm* — Lee, Hong, Degerman, Kang & Waimey

(57) ABSTRACT

A mobile communication terminal and a method for operating the same are disclosed. The mobile communication terminal can be connected to first and second communication networks. The first communication network may be a legacy network and the second communication network may be a Long Term Evolution (LTE) network. The mobile communication terminal is also capable of displaying a two-dimensional (2D) image and a three-dimensional (3D) image. The mobile communication terminal reproduces a 2D image, receives a display mode switch request signal from a user, determines whether 3D image reception is available according to an environment of a current connected mobile communication network, receives a 3D image from a server, if 3D image reception is available and a 2D image from the server if 3D image reception is not available, and displays the received 3D image or 2D image.

26 Claims, 31 Drawing Sheets

FIG. 8
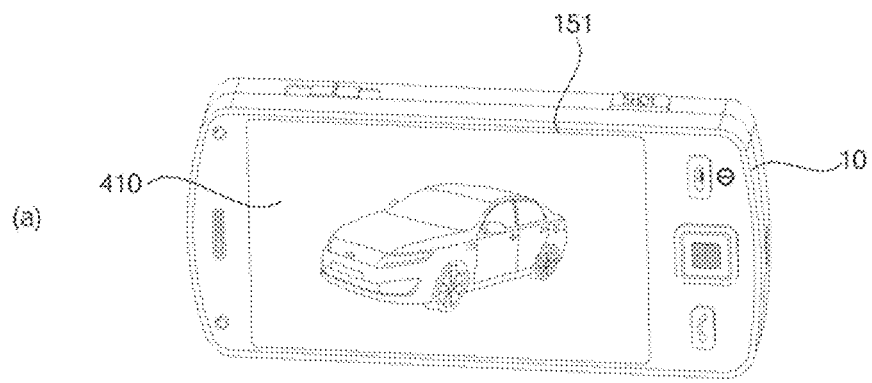
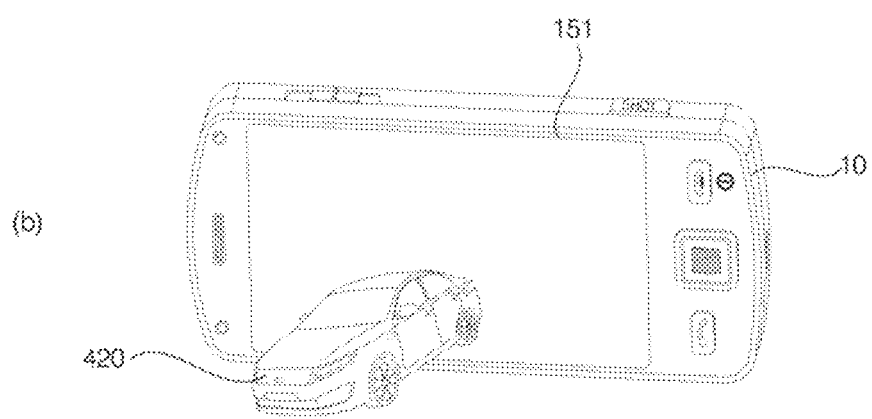
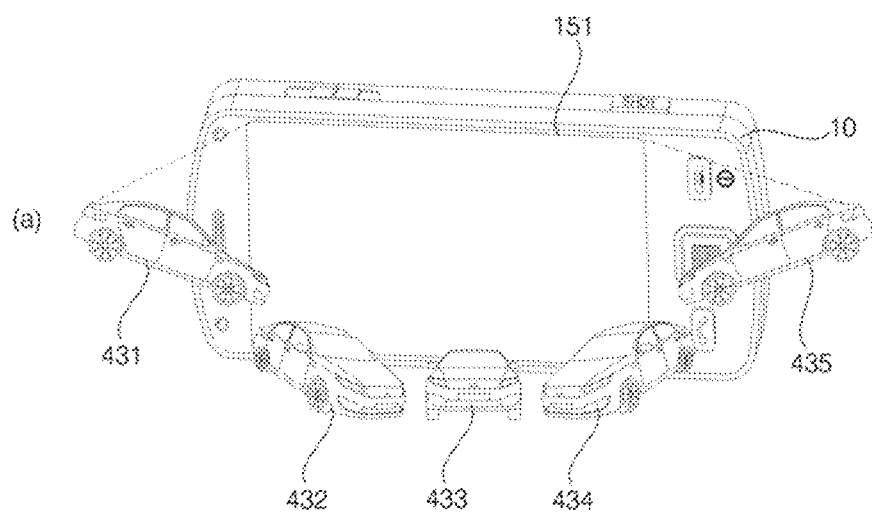

FIG. 33

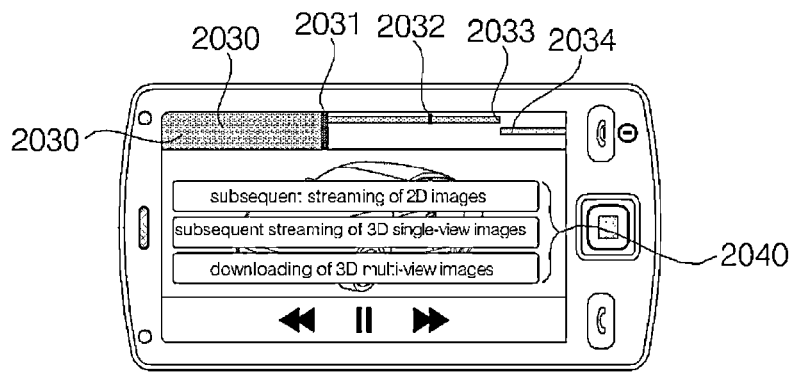

FIG. 34

| | | | | | | |
|---|---|---|---|---|---|---|
| (a) | 1 | 3D MULTI-VIEW IMAGE DATA | RECEIVER ADD | SENDER ADD | TIMING INFORMATION | OTHER PACKET INFORMATION |
| (b) | 0 | 3D SINGLE-VIEW IMAGE DATA | RECEIVER ADD | SENDER ADD | TIMING INFORMATION | OTHER PACKET INFORMATION |
| (c) | 1 | 3D SINGLE-VIEW IMAGE DATA | RECEIVER ADD | SENDER ADD | TIMING INFORMATION | OTHER PACKET INFORMATION |
| (d) | 0 | 2D IMAGE DATA | RECEIVER ADD | SENDER ADD | TIMING INFORMATION | OTHER PACKET INFORMATION |
| (e) | 1 | 2D IMAGE DATA | RECEIVER ADD | SENDER ADD | TIMING INFORMATION | OTHER PACKET INFORMATION |
| | 2110 | 2120 | 2130 | 2140 | 2150 | 2160 |

MOBILE COMMUNICATION TERMINAL AND METHOD FOR OPERATING THE SAME

CROSS-REFERENCE TO RELATED APPLICATION

Pursuant to 35 U.S.C. 119(a), this application claims the benefit of earlier filing date and right of priority to Korean Patent Application No. 10-2011-0060832, filed on Jun. 22, 2011, the contents of which are hereby incorporated by reference herein in its entirety.

BACKGROUND OF THE INVENTION

1. Field of the Invention

The present invention relates to a mobile communication terminal and a method for operating the same, and more particularly, to a mobile communication terminal for providing a three-dimensional (3D) multi-view function and a method for operating the same.

2. Description of the Related Art

A mobile communication terminal is a portable device capable of performing one or more of a voice and video call function, a function of simultaneously exchanging messages with a plurality of terminals or inputting or outputting information, a chatting function, and a data storing function, while being carried with a user. Along with the diversification of its functions, the mobile communication terminal has evolved to an integrated multimedia player having complex functions such as picture-taking, video recording, playback of music files or video files, gaming, broadcast reception, and wireless Internet.

To implement complex functions in such a mobile communication terminal developed as a multimedia player, new attempts have been taken in terms of hardware or software. For example, a User Interface (UI) environment is built to render search and selection of functions user-friendly.

Furthermore, as 3$^{rd}$ Generation Partnership Project (3GPP) mobile communication systems operating based on a radio access technology, Wideband Code Division Multiple Access (WCDMA) have been widely deployed, high-speed transmission of a large amount of data and seamless services are possible. Therefore, extensive research is being conducted on development of multimedia functions well suited to the wireless communication environment, for mobile communication terminals.

SUMMARY OF THE INVENTION

Therefore, the present invention has been made in view of the above problems, and it is an object of the present invention to provide a technique for selecting, providing, and editing a three-dimensional (3D) multi-view image in a new network environment.

In accordance with an aspect of the present invention, the above and other objects can be accomplished by the provision of a method for operating a mobile communication terminal capable of connecting to a first communication network and a second communication network, including connecting to the first communication network, receiving at least one of a two-dimensional (2D) image and a three-dimensional (3D) single-view image from a server through one of the first and second communication networks, receiving 3D multi-view images additionally from the server through the second communication network, if the second communication network is connected, receiving a display mode selection signal from a user, and displaying at least one of the 2D image, the 3D single-view image, and the 3D multi-view images according to the display mode selection signal.

In accordance with another aspect of the present invention, there is provided a mobile communication terminal capable of connecting to a first communication network and a second communication network, including a wireless communication module for connecting to the first communication network, receiving at least one of a 2D image and a 3D single-view image from a server through one of the first and second communication networks, and receiving 3D multi-view images additionally from the server through the second communication network, if the second communication network is connected, a user input unit for receiving a display mode selection signal from a user, a controller for processing at least one of the 2D image, the 3D single-view image, and the 3D multi-view images according to the display mode selection signal and outputting a video signal corresponding to the processed image, and a display for displaying the at least one of the 2D image, the 3D single-view image, and the 3D multi-view images according to the video signal received from the controller.

The first communication network is a legacy network, the second communication network is a Long Term Evolution (LTE) network, the 3D single-view image is a 3D image viewed from one viewpoint, and the 3D multi-view images are 3D images viewed from two or more viewpoints.

BRIEF DESCRIPTION OF THE DRAWINGS

The above and other objects, features and other advantages of the present invention will be more clearly understood from the following detailed description taken in conjunction with the accompanying drawings, in which:

FIG. 8 illustrates a two-dimensional (2D) image and 3D images which are displayed according to an embodiment of the present invention;

FIGS. 15 to 34 illustrate exemplary operations of the mobile communication terminal for providing 3D multi-view images or controlling viewpoints according to embodiments of the present invention.

DETAILED DESCRIPTION OF THE PREFERRED EMBODIMENTS

Embodiments of the present invention will be described below with reference to the attached drawings.

A mobile communication terminal as set forth herein may be any of a portable phone, a smart phone, a laptop computer, a digital broadcast terminal, a Personal Digital Assistant (PDA), a Portable Multimedia Player (PMP), a camera, a navigator, a tablet computer, an e-book reader, etc. The terms "module" and "unit" used to signify components are used herein to help the understanding of the components and thus they should not be considered as having specific meanings or roles. Accordingly, the terms "module" and "unit" may be used interchangeably.

Figure 1:
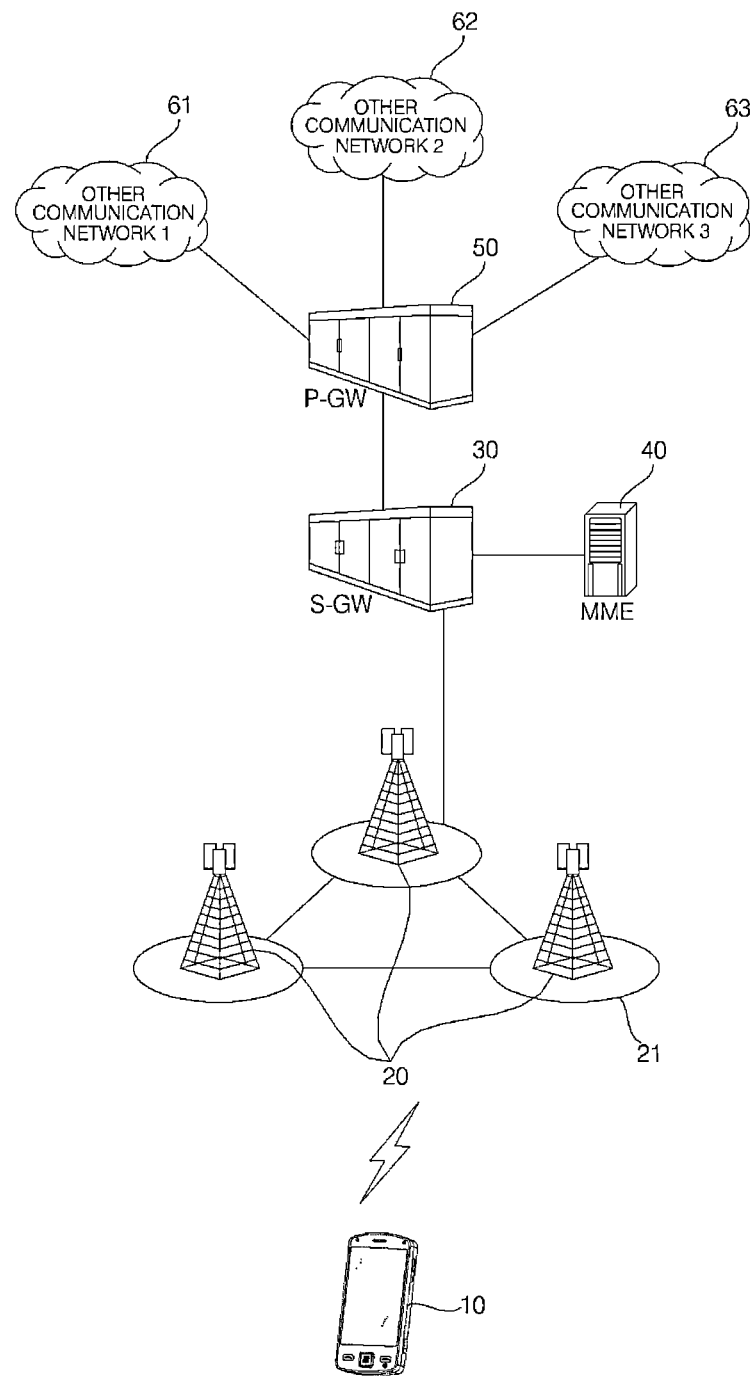
FIG. 1 illustrates the configuration of a wireless communication system in which a mobile communication terminal operates according to an embodiment of the present invention.

FIG. 1 illustrates an exemplary configuration of a wireless communication system in which a mobile communication terminal 10 operates according to an embodiment of the present invention. The wireless communication system illustrated in FIG. 1 may have an Evolved-Universal Mobile Telecommunications System (E-UMTS) network structure. E-UMTS is also called Long Term Evolution (LTE).

The mobile communication terminal or User Equipment (UE) 10 has mobility. The term 'UE' may be replaced with other terms such as terminal, User Terminal (UT), Mobile Station (MS), Subscriber Station (SS), wireless device, etc. Evolved Node Bs (eNBs or eNode Bs) 20 are typically fixed stations that communicate with the UE 10. The term 'eNB or eNode B' is interchangeable with other terms such as Base Station (BS), Base Transceiver System (BTS), Access Point (AP), etc. One eNB 20 may cover one or more cells 21.

An interface for transmitting user traffic or control traffic may be used between eNBs 20. Communication directed from an eNB 20 to the UE 10 is referred to as downlink and communication directed from the UE 10 to the eNB 20 is referred to as uplink.

The eNBs 20 may be connected to each other via an X2 interface. The eNBs 20 are connected to an Evolved Packet Core (EPC), particularly, a Serving Gateway (S-GW) 30 and a Mobility Management Entity (MME) 40 via S1 interfaces. The S1 interfaces support a many-to-many relation between the eNBs 20 and the S-GW 30 and the MME 40.

A network interface is set up by establishing the S1 interface between the MME 40 at the center of the system and the eNBs 20 and the X2 interfaces being a network link for direct communication between the eNBs 20 and other eNBs 20 within another cell in the current system. The S1 interfaces are designed to enable the eNBs 20 to exchange Operation and Management (OAM) information with the MME 40 by exchanging signals, for supporting mobility of the UE 10. The X2 interfaces interface signals for fast handover, load indicator information, and self-optimization information between the eNBs 20.

The eNBs 20 carry out the following functions: (1) Radio Resource Management (RRM) functions including radio bear control, radio admission control, connection mobility control, and dynamic resource allocation to the UE 10; (2) Internet Protocol (IP) header compression and encryption of user data streams; (3) routing of user-plane data to the S-GW 30; (4) scheduling and transmission of paging messages; (5) scheduling and transmission of broadcast information; and (6) measurement for mobility and scheduling and setting of a measurement report.

The MME 40 controls signals between the eNBs 20 and the S-GW 30 and determines a node to which data received from the UE 10 is to be routed. The MME 40 has the following functions: (1) distribution of paging messages to the eNBs 20; (2) Non Access Spectrum (NAS) signaling, NAS signaling security, ciphering/deciphering, and integrity protection; (3) Control of intra-LTE handover; (4) tracking area list management; (5) Packet Data Network (PDN) GateWay (P-GW) and Serving GateWay (S-GW) selection for a UE; (6) MME selection for handovers with MME change; (7) SGSN selection for handovers to 2G or 3G 3GPP access networks; (8) idle-mode UE tracking and paging control; (9) user authentication/authorization via Home Subscriber Server (HSS) interworking; (10) lawful interception of signaling; (11) UE reachability procedures; and (12) generation and allocation of temporary identities to UEs.

The S-GW 30 is a local mobility anchor point for inter-eNB handovers as well as managing mobility between the 3GPP network and the Evolved UMTS Terrestrial Radio Access Network (E-UTRAN). The P-GW 50 is an attachment point of traffic data incoming to an IP Multimedia Subsystem (IMS) in the LTE system. It provides an anchoring function for mobility of the UE 10 between the LTE network and a non-3GPP network. The P-GW 50 is also connected to other communication networks 61, 62 and 63. The communication networks 61, 62 and 63 may include a telephone network, a wired Internet, etc.

The S-GW 30 is connected to the P-GW 50 via an S5 interface, which can support two distinct protocols, either the GPRS tunneling protocol (GTP) or the Proxy Mobile IPv6 (PMIPv6) protocol. When using PMIP, the S-GW 30 also has a direct connection to a Policy and Charging Rules Function (PCRF) via a Gxc interface to supplement the lack of event reporting not available in the PMIPv6 protocol. PMIPv6 maintains IP connectivity instead of a requiring an Evolved Packet System (EPS) bearer. The EPS bearer goes from the UE to the PDN-GW 50 with appropriate Quality of Service (QoS).

The P-GW 50 is a terminal point of a packet data interface. It provides an anchoring function for sessions with external packet data networks. A critical function of the P-GW 50 is enforcement of per-user-based packet filtering, allowing gating and rate enforcement policies as well as service level charging.

User-plane LTE traffic is carried over Service Data Flows (SDFs), which are aggregated over a set of virtual connections that match a specific filter policy or template. SDFs are in turn carried over EPS bearers. An EPS bearer uniquely identifies data flows that receive a common QoS treatment between the UE 10 and the P-GW 50. The functions of the P-GW 50 and the S-GW 30 are summarized as follows.

1) Mobility anchoring between LTE and non-3GPP technologies (e.g. Worldwide interoperability for Microwave access (WiMax) and 3GPP2); 2) UE connection management; 3) policy enforcements via interworking with PCRF; 4) charging support; 5) per-user-based packet filtering; 6) lawful interception; 7) UE IP allocation; and 8) packet screening.

Figure 2:
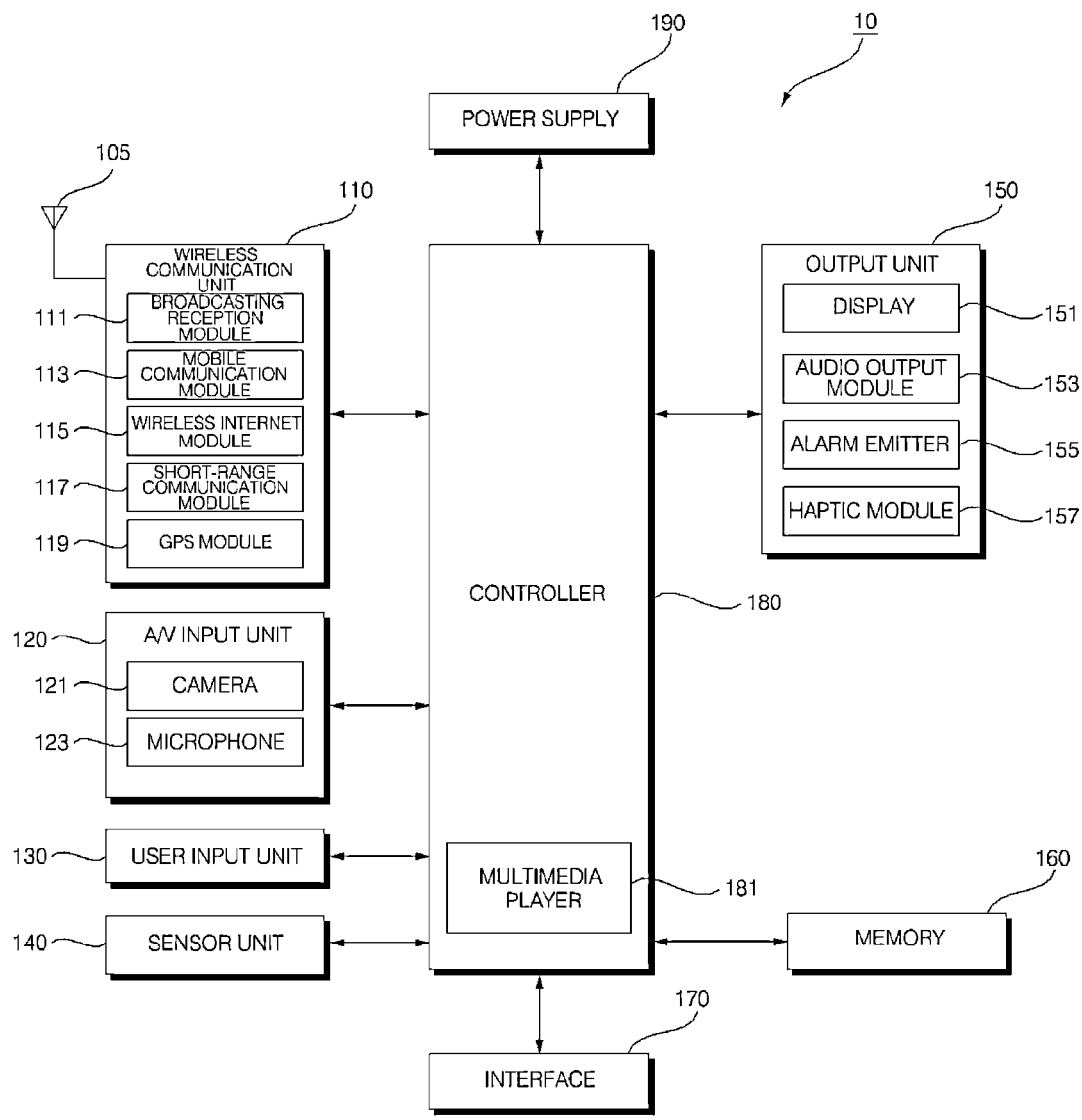
FIG. 2 is a block diagram of the mobile communication terminal according to an embodiment of the present invention.

FIG. 2 is a block diagram of the mobile communication terminal 10 according to an embodiment of the present invention. With reference to FIG. 2, functional components the mobile communication terminal 10 will be described below.

Referring to FIG. 2, the mobile communication terminal 10 may include a wireless communication module 110, an audio/Video (A/V) input unit 120, a user input unit 130, a sensor unit 140, an output unit 150, a memory 160, an interface 170, a controller 180, and a power supply 190. Two or more components of the mobile communication terminal 10 may be combined into a single component or a single component thereof may be separated into two or more components in alternative embodiments.

The wireless communication module 110 may include a broadcasting reception module 111, a mobile communication module 113, a wireless Internet module 115, a short-range communication module 117, and a Global Positioning System (GPS) module 119.

The broadcasting reception module 111 receives at least one of a broadcast signal or broadcasting-related information on a broadcast channel from an external broadcasting management server. The broadcast channel may be any of a satellite channel, a terrestrial channel, etc. The broadcasting management server may refer to a server for generating and transmitting at least one of a broadcast signal or broadcasting-related information or a server for receiving at least one of an already generated broadcast signal or already generated broadcasting-related information and providing the received at least one of the broadcast signal or the broadcasting-related information to terminals.

The broadcast signal may be a TV broadcast signal, a radio broadcast signal, a data broadcast signal, or a combination of the TV broadcast signal and the data broadcast signal or the radio broadcast signal and the data broadcast signal. The broadcasting-related information may be information related to a broadcast channel, a broadcast program, or a broadcast service provider. The broadcasting-related information may be provided over a mobile communication network. In this case, the mobile communication module 113 may receive the broadcasting-related information. The broadcasting-related information may take various forms such as a Digital Multimedia Broadcasting (DMB) Electronic Program Guide (EPG) or a Digital Video Broadcast-Handheld (DVB-H) EPG.

The broadcasting reception module 111 may receive a broadcast signal through a broadcasting system, particularly a digital broadcast signal through a digital broadcasting system such as DMB-Terrestrial (DMB-T), DMB-Satellite (DMB-S), Media Forward Link Only (MediaFLO), DVB-H, or Integrated Services Digital Broadcast-Terrestrial (ISDB-T). The broadcasting reception module 111 may be adapted to all other broadcasting systems that provide broadcast signals as well as the digital broadcasting system. The broadcast signal and/or broadcasting-related information received at the broadcasting reception module 111 may be stored in the memory 160.

The mobile communication module 113 transmits and receives a radio signal to and from at least one of a BS, an external terminal, or a server over a mobile communication network. The radio signal may include a voice call signal, a video call signal, or text/other various types of data involved in multimedia message transmission and reception.

The wireless Internet module 115 is a built-in or external module for providing wireless Internet connectivity to the mobile communication terminal 10. The wireless Internet module 115 may operate in conformance to Wireless Local Area Network (WLAN) (Wireless Fidelity (WiFi)), Wireless broadband (Wibro), World Interoperability for Microwave Access (WiMAX), High Speed Downlink Packet Access (HSDPA), etc.

The short-range communication module 117 is used for short-range communication. For short-range communication, the short-range communication module 117 may conform to Bluetooth, Radio Frequency Identification (RFID), Infrared Data Association (IrDA), Ultra WideBand (UWB), ZigBee, etc.

The GPS module 119 receives location information from a plurality of GPS satellites.

The A/V input unit 120 is used to receive an audio signal or a video signal and may include a camera 121 and a microphone 123. The camera 121 processes video frames including a still image or a video acquired from an image sensor in video call mode or camera mode. The processed video frames may be displayed on a display 151.

The video frames processed by the camera 121 may be stored in the memory 160 or transmitted externally through the wireless communication module 110. Two or more cameras 121 may be provided to the mobile communication terminal 10 depending on the configuration specification of the mobile communication terminal 10.

The microphone 123 receives an external audio signal and processes the audio signal to electrical voice data in call mode, recording mode, or voice recognition mode. In the call mode, the processed voice data may be converted to a format transmittable to a BS and output through the mobile communication module 113. Various noise cancellation algorithms are available to the microphone 123 in order to eliminate noise which is introduced during input of an external audio signal.

The user input unit 130 generates key input data that the user inputs to control the operation of the mobile communication terminal 10. The user input unit 130 may include a keypad, a dome switch, a (resistive/capacitive) touch pad, etc. to receive a command or information through the user's push or touch manipulation. The user input unit 130 may be configured to operate in a jog wheel or jog fashion involving key rotation, in a joy stick fashion, or in a finger mouse fashion. Especially when a touch pad is layered with the display 451, the resulting structure may be referred to as a touch screen.

The sensor unit 140 senses the current state of the mobile communication terminal 10, such as the open or closed state, position, or user touch of the mobile communication terminal 10 and generates a sensing signal to control the operation of the mobile communication terminal 10 according to the sensed state. For example, if the mobile communication terminal 10 is a sliding phone, the sensor unit 140 may sense whether the sliding phone is opened or closed. In addition, the sensor unit 140 may sense whether the power supply 190 is supplying power or whether the interface 170 is coupled with an external device.

The sensor unit 140 may include a proximity sensor 141, a pressure sensor 143, and a motion sensor 145. The proximity sensor 141 may detect an object approaching the mobile communication terminal 10 or the existence or absence of an object in the vicinity of the mobile communication terminal 10 without mechanical contact. The proximity sensor 141 may detect a nearby object based on a change in an alternating or static magnetic field or the variation rate of capacitance. One or more proximity sensors 141 may be provided to the mobile communication terminal 10 depending on the specification of the mobile communication terminal 10.

The pressure sensor 143 may determine whether pressure is applied to the mobile communication terminal 10 and how strong the pressure is. The pressure sensor 143 may be installed at a part of the mobile communication terminal 10 requiring pressure detection according to the environment in which the mobile communication terminal 10 is used. If the pressure sensor 143 is installed on the display 151, a touch input on the display 151 may be identified from a pressed touch input on the display 151, for which a stronger pressure is applied than for the touch input, according to a signal output from the pressure sensor 143. In addition, in case of the pressed touch input, the magnitude of pressure applied to the display 151 may also be known from the signal output from the pressure sensor 143.

The motion sensor 145 senses the position or motion of the mobile communication terminal 10 using an acceleration sensor, a gyro sensor, etc. The acceleration sensor is a device that converts an acceleration change in a direction to an electrical signal. Along with the development of the Micro-ElectroMechanical System (MEMS) technology, acceleration sensors have become popular. There are a broad range of acceleration sensors from an acceleration sensor that measures a large acceleration value for sensing collision in an airbag system for a vehicle to an acceleration sensor that measures a very small acceleration value for use as an input means capable of fine hands' motions when a game is played. Typically, 2- or 3-axis acceleration sensors are packed into one package or a single z-axis acceleration sensor is used depending on use environments. Accordingly, when not a Z-axis acceleration sensor but an X-axis or Y-axis acceleration sensor is to be used, the acceleration sensor may be erected on a main substrate by means of a substrate fragment.

The gyro sensor measures an angular velocity and thus senses a rotated direction with respect to a reference direction.

The output unit 150 outputs an audio signal, a video signal, or an alarm signal. The output unit 150 may include the display 151, an audio output module 153, an alarm emitter 155, and a haptic module 157.

The display 151 displays information processed in the mobile communication terminal 10. For example, when the mobile communication terminal 10 is in the call mode, the display 151 displays a UI or Graphical User Interface (GUI) related to a call. In the video call mode or the camera mode, the display 151 may display captured or received images separately or simultaneously and may also display a UI or GUI.

As described before, if a touch screen is configured by layering the display 151 with a touch pad, the display 151 may be used not only as an output device but also as an input device capable of receiving information by a user's touch.

If the display 151 is configured into a touch screen, it may include a touch screen panel, a touch screen panel controller, etc. In this case, the touch screen panel, which is a transparent panel attached on the exterior of the touch screen, may be connected to an internal bus of the mobile communication terminal 10. The touch screen panel keeps monitoring whether it is touched by a user. Upon detection of a touch input, the touch screen panel provides a signal corresponding to the touch input to the touch screen panel controller. The touch screen panel controller processes the received signal into data and transmits the data to the controller 180 so that the controller 180 may determine the presence or absence of a touch input and may locate a touched spot on the touch screen.

The display 151 may be configured into electronic paper (e-paper). E-paper is a kind of reflective display having excellent visual characteristics including a high resolution, a wide viewing angle, and a bright white background, like paper and ink. The e-paper may be formed on any substrate of a material such as plastic, metal, paper, etc. Since the e-paper can keep an image after power is off and does not require a backlight assembly, it lengthens the battery lifetime of the mobile communication terminal 10. The display 151 may be configured into e-paper using electrostatic-charged hemispherical twist balls, electrophoretic deposition, or microcapsules.

Besides, the display 151 may be configured into at least one of a Liquid Crystal Display (LCD), a thin film transistor-LCD, an Organic Light Emitting Diode (OLED) display, a flexible display, and a 3D display. Depending on implementation of the mobile communication terminal 10, the mobile communication terminal 10 may be provided with two or more displays 151. For example, both external and internal displays (not shown) may be mounted to the mobile communication terminal 10.

The audio output unit 153 outputs audio data received from the wireless communication module 110 or stored in the memory 160 in call termination mode, call mode, recording mode, voice recognition mode, or broadcast reception mode. The audio output module 153 also outputs an audio signal involved in a function performed by the mobile communication terminal 10, for example, an audio signal related to a call incoming sound, a message reception sound, etc. The audio output module 153 may include a speaker, a buzzer, etc.

The alarm emitter 155 outputs a signal notifying occurrence of an event to the mobile communication terminal 10. Events of the mobile communication terminal 10 include call signal reception, message reception, key signal input, etc. The alarm emitter 155 may output an event notification signal in a form other than an audio signal or a video signal. For example, the event notification signal may be output in the form of vibrations. Upon receipt of a call signal or a message, the alarm unit 155 may output a signal notifying the call signal or message reception. Upon receipt of a key signal, the alarm unit 155 may output a feedback signal for the key signal input. Thus, the user is aware of occurrence of an event from a signal output from the alarm unit 155. A signal notifying of occurrence of an event may also be output through the display 151 or the audio output module 153 in the mobile communication terminal 10.

The haptic module 157 generates various tactile effects that a user can feel. A major example of the tactile effects is vibrations. When the haptic module 157 generates vibrations as tactile effects, the intensity and pattern of the vibrations may be altered. The haptic module 157 may synthesize different vibration effects and output the synthesized vibration effects. Alternatively, the haptic module 157 may output different vibration effects sequentially.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile communication terminal 10 may include two or more haptic modules 157.

The memory 160 may store programs required for processing and controlling in the controller 180 or temporarily store input or output data (e.g. a phone book, still images, videos, etc.).

The memory 160 may include at least one of a flash memory type storage medium, a hard disk type storage medium, a multimedia card micro type storage medium, a card type memory (e.g., a Secure Digital (SD) or eXtreme Digital (XD) memory), a Random Access Memory (RAM), and a Read-Only Memory (ROM). The mobile communication terminal 10 may operate a web storage, which performs the storage function of the memory 160 on the Internet.

The interface 170 interfaces between the mobile communication terminal 10 and all external devices connected to the mobile communication terminal 10. The external devices may include a wired/wireless headset, an external charger, a wired/wireless data port, a memory card, a card socket such as a Subscriber Identification Module (SIM) card or a User Identity Module (UIM) card, an audio Input/Output (I/O) port, a video I/O port, an earphone, etc. The interface 170 may receive data or power from such an external device and transfer the data or power to each component of the mobile communication terminal 10. In addition, the interface 170 may transmit data from the mobile communication terminal 10 to the external device.

When the mobile communication terminal 10 is connected to an external cradle, the interface 170 may provide a path for supplying power from the external cradle to the mobile communication terminal 10 or for transmitting various user-input command signals from the external cradle to the mobile communication terminal 10.

The controller 180 typically provides overall control to the mobile communication terminal 10 by controlling the operation of each component. For example, the controller 180 controls and processes voice call, data communication, video call, etc. The controller 180 may include a multimedia play module 181 for playing multimedia. The multimedia play module 181 may be configured in hardware inside the controller 180 or in software separately from the controller 180.

The power supply 190 may receive power from an external power source or an internal power source and supply power to the other components of the mobile communication terminal 10.

The mobile communication terminal 10 having the above-described configuration may be configured to operate in communication systems capable of transmitting data in frames or packets, including a wired/wireless communication system or a satellite communication system.

Figure 3:
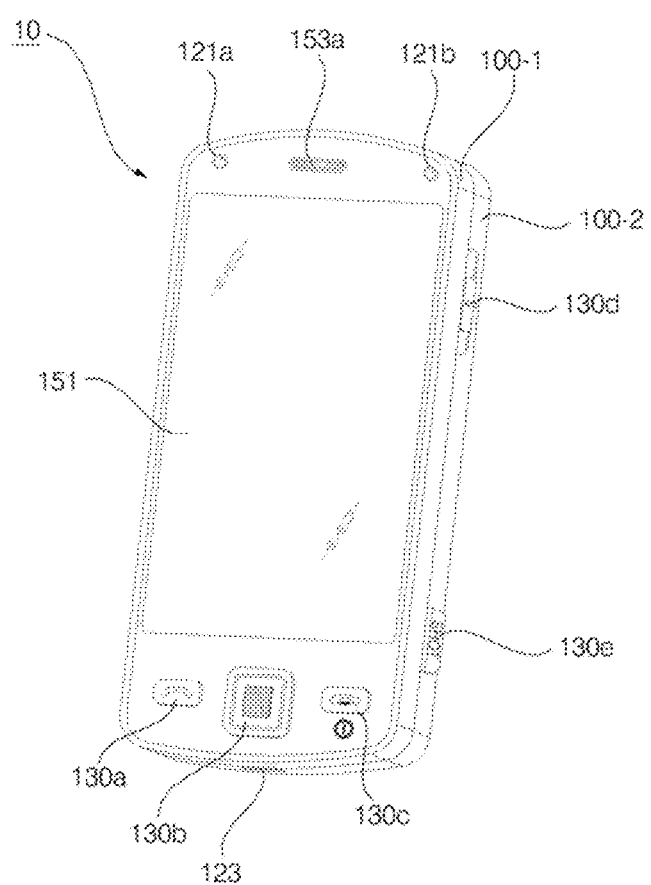
FIG. 3 is a front perspective view of the mobile communication terminal according to an embodiment of the present invention.
Figure 4:
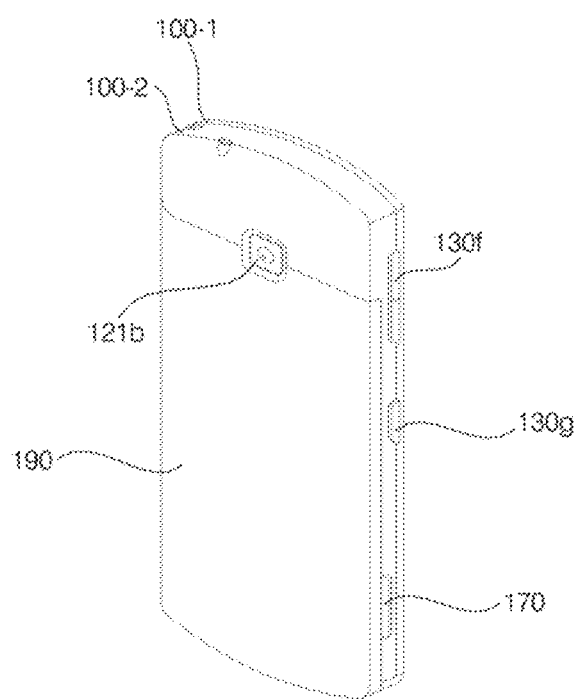
FIG. 4 is a rear perspective view of the mobile communication terminal illustrated in FIG. 3.

FIG. 3 is a front perspective view of the mobile communication terminal according to an embodiment of the present invention and FIG. 4 is a rear perspective view of the mobile communication terminal illustrated in FIG. 3. With reference to FIGS. 3 and 4, the exterior of the mobile communication terminal will be described, centering on its components. While the following description is given in the context of a bar-type mobile communication terminal having a front touch screen, it is purely exemplary. Thus it is to be understood that the present invention is also applicable to other types of mobile communication terminals including a folder type, a swing type, and a slider type.

Referring to FIG. 3, the exterior of the mobile communication terminal 10 is formed by a front case 100-1 and a rear case 100-2. Various electronic parts are installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as Stainless Steel (STS) or Titanium (Ti).

The display 151, a first audio output module 153a, a first camera 121a, and first through third user input modules 130a through 130c may be disposed in the main body of the mobile communication terminal 10, particularly on the front case 100-1. Fourth and fifth user input modules 130d and 130e and the microphone 123 may be disposed on one side of the rear case 100-2.

If a touch pad is layered with the display 151, the display 151 may serve as a touch screen so that the user can enter various types of information to the mobile communication terminal 10 simply by touching the display 151.

The first audio output module 153a may be implemented as a receiver or a speaker. The first camera 121a may be configured to be suitable for capturing a still image or video of the user. The microphone 123 may be configured to properly receive the user's voice or other sounds.

The first through fifth user input modules 130a through 130e and sixth and seventh user input modules 130f and 130g may be collectively referred to as the user input unit 130, and any means can be employed as the first through seventh user input modules 130a through 130f so long as it can operate in a tactile manner.

For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130a through 130c may operate as function keys for entering a command such as start, end, or scroll, the fourth user input module 130d may operate as a function key for selecting an operating mode for the mobile communication terminal 10, and the fifth user input module 130e may operate as a hot key for activating a special function within the mobile communication terminal 10.

Referring to FIG. 4, a second camera 121b may be additionally provided on the rear surface of the rear case 100-2, and the sixth and seventh user input modules 130f and 130g and the interface 170 may be disposed on one side of the rear case 100-2.

The second camera 121b may have an image capture direction which is substantially the opposite to that of the first camera 121a, and may have a different resolution from that of the first camera 121a. A flash (not shown) and a mirror (not shown) may be disposed in the vicinity of the second camera 121b. To capture a 3D image, a third camera may further be installed near to the second camera 121b.

When an image of a subject is captured with the second camera 121b, the flash may illuminate the subject. The mirror may allow the user to see himself or herself when he or she wants to capture his or her own image (self-picture taking) by using the second camera 121b.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface 170 may be used as a passage allowing the mobile communication terminal 10 to exchange data with an external device. A broadcast signal reception antenna (not shown) may be disposed at one side of the front or rear case 100-1 or 100-2, in addition to an antenna used for calls. The broadcast signal reception antenna may be installed such that it can be extended from the rear case 100-2.

The power supply 190 may be mounted on the rear case 100-2 to supply power to the mobile communication terminal 10. The power supply 190 may be, for example, a chargeable battery which can be detachably mounted to the rear case 100-2 for being charged.

The second camera 121b and the other elements that have been described as being provided on the rear case 100-2 may be provided on the front case 100-1. In addition, the first camera 121a may be configured to be rotatable and thus to allow image capturing even in the image capture direction of the second camera 121b.

Figure 5:
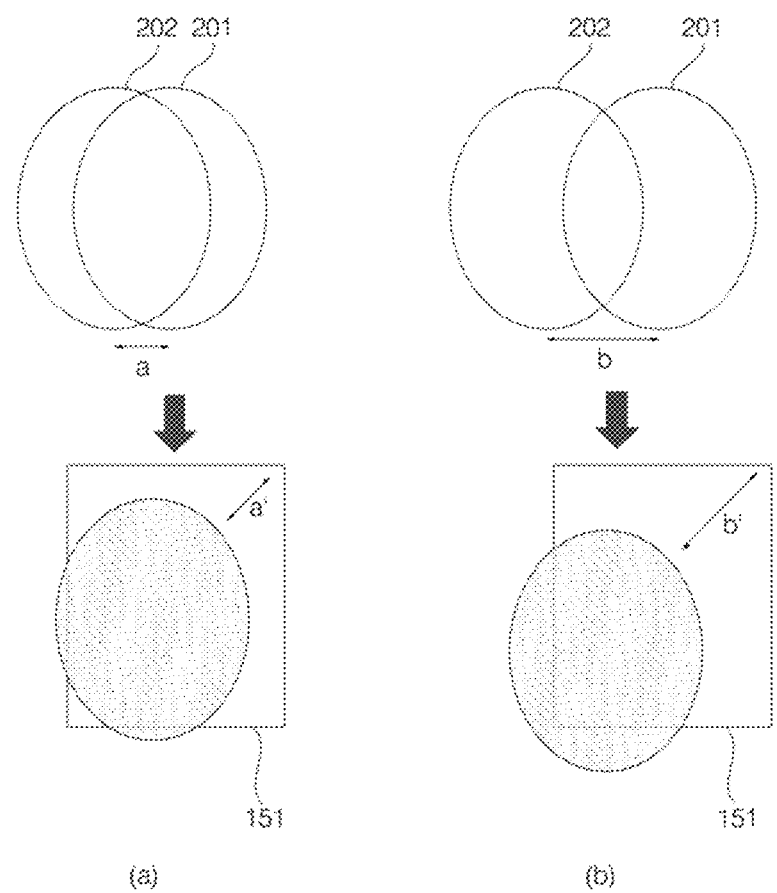
FIG. 5 is a view referred to for describing depth illusions of displayed three-dimensional (3D) images according to an embodiment of the present invention.

FIG. 5 is a view referred to for describing depth illusions of displayed 3D images according to an embodiment of the present invention.

A 3D image may be composed of a plurality of viewpoint images. A user can view a multi-viewpoint image with the left and right eyes. The user is tricked into feeling a stereoscopic sense from a 3D image due to the disparity between images viewed by the left and right eyes. In accordance with an embodiment of the present invention, a plurality of viewpoint images combined into a 3D image are a left-eye image perceived by the left eye and a right-eye image perceived by the right eye.

Referring to FIG. 5, it is noted that the same image or the same 3D object has different depth illusions according to the disparities between a left-eye image 201 and a right-eye image 202 on the display 151. The depth of the display 151 may be set as 0 in the embodiment of the present invention. Thus, it may be set that the depth of a 3D image perceived as protruding from the display 151 is positive-signed and the depth of a 3D image perceived as receding from the display 151 is negative-signed.

The disparity 'a' between the left-eye image 201 and the right-eye image 202 in FIG. 5(a) is smaller than the disparity 'b' between the left-eye image 201 and the right-eye image 202 in FIG. 5(b). That is, the left-eye image 201 and the right-eye image 202 are more apart from each other in the example of FIG. 5(b) than in the example of FIG. 5(a).

Consequently, the depth of a 3D image or 3D object created in FIG. 5(a) is smaller than the depth of a 3D image or 3D object created in FIG. 5(b). Let the depths illustrated in FIGS. 5(a) and 5(b) be denoted by a' and b', respectively. Then, a relationship a'<b' is established according to the relationship a<b. That is, when a protruding-looking 3D image is to be realized, the disparity between the left-eye image 201 and the right-eye image 202 can be widened or narrowed to thereby increase or decrease the depth illusion and stereoscopic effect of the resulting 3D image.

Figure 6:
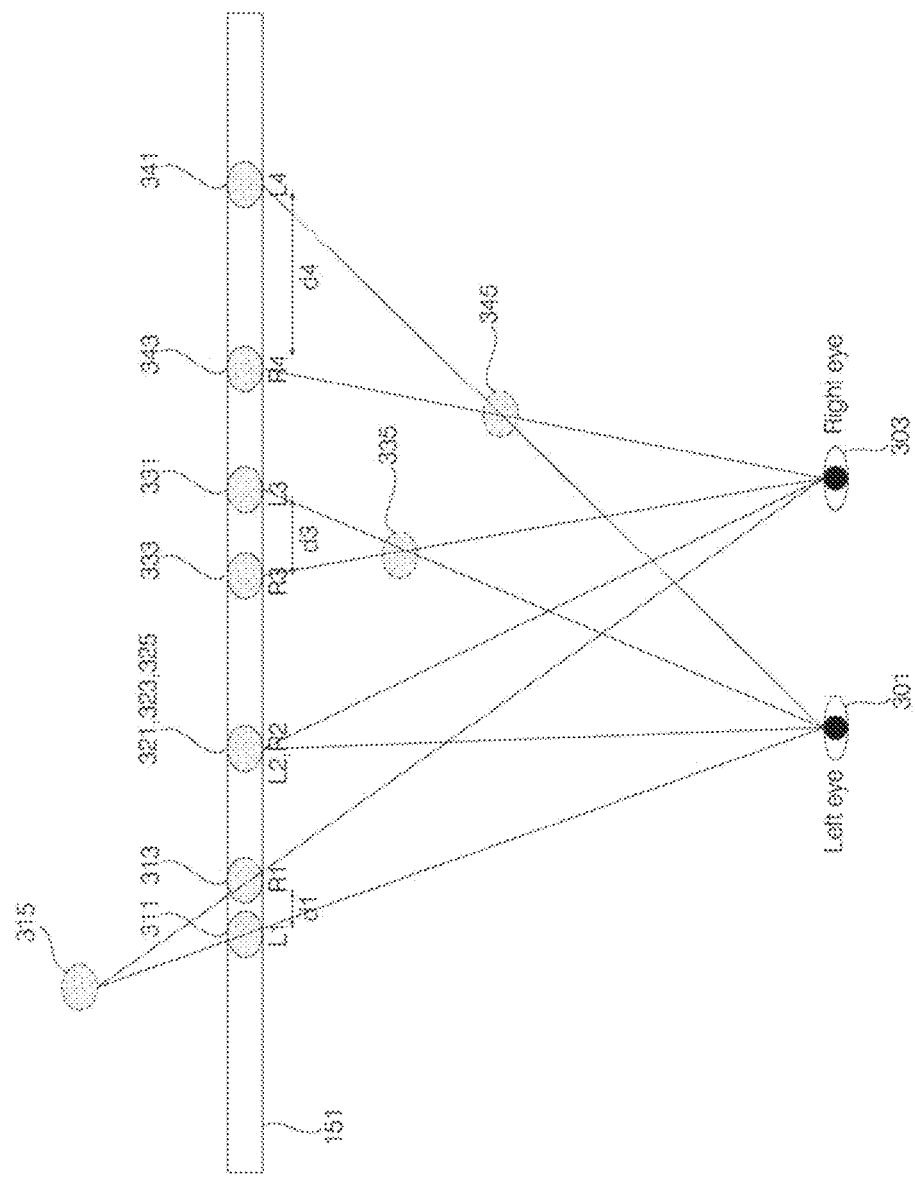
FIG. 6 illustrates different depth illusions of 3D images or 3D objects according to an embodiment of the present invention.

FIG. 6 illustrates different depth illusions of 3D images or 3D objects according to an embodiment of the present invention.

As described before, a 3D image is composed of multi-viewpoints images, which may be a left-eye image a right-eye image, by way of example. In this case, the user may be tricked into perceiving an image formed at different positions according to different disparities between the left-eye image and the right-eye image, as illustrated in FIG. 6. With reference to FIG. 6, the stereoscopic sense or perspective of an image that the user feels according to the distance or disparity between a left-eye image and a right-eye image will be described below.

Referring to FIG. 6, there is a plurality of images or objects having different depths. In accordance with an embodiment of the present invention, the objects may include a volume control button, a channel switching button, a Picture In Picture (PIP) image, an EPG containing broadcast program information, and various menus, widgets, icons, navigation tabs, a scroll bar, a progress bar, a text box, and a window in an image display apparatus.

These images or objects are referred to as first, second, third, and fourth objects 315, 325, 335 and 345, respectively.

That is, the first object 315 is composed of a first left-eye image based on a first left-eye image signal and a first right-eye image based on a first right-eye image signal. In other words, an image signal forming the first object includes the first left-eye and right-eye image signals. FIG. 6 illustrates positions at which the first left-eye image based on the first left-eye image signal and the first right-eye image based on the first right-eye image signal are formed on the display 151. In addition, FIG. 6 illustrates the disparity between the first left-eye image and the first right-eye image. The same description of the first object 315 is applied to the second through fourth objects 325, 335 and 345. For the convenience' sake of description, a left-eye image and a right-eye image for one object displayed on the display 151, the disparity between the two images, and the object will be denoted by uniform reference numerals.

The first object 315 is created by combining a first left-eye image 311 (L1) based on a first left-eye image signal with a first right-eye image 313 (R1) based on a first right-eye image signal, with a disparity d1 between the first left-eye and right-eye images 311 and 313. The user sees an image as formed at the intersection between a line connecting a left eye 301 to the first left-eye image 311 and a line connecting a right eye 303 to the first right-eye image 313. Therefore, the user is tricked into perceiving the first object 315 as located behind the display 151. The distance between the display 151 and the first object 315 perceived to the user may be represented as a depth. When an object is perceived to the user as being positioned behind the display 151, the depth of the object is negative-signed. On the other hand, when an object is perceived to the user as being positioned before the display 151, the depth of the object is positive-signed.

The second object 325 is created by combining a second left-eye image 321 (L2) with a second right-eye image 323 (R2) on the display 151. In the embodiment of the present invention, the second right-eye image 323 and the second left-eye image 321 are displayed at the same position on the display 151, thus with a disparity of 0 between the second left-eye and right-eye images 321 and 323. Thus, the user perceives the second object 325 as formed at the intersection between a line connecting the left eye 301 to the second left-eye image 321 and a line connecting the right eye 303 to the second right-eye image 323. Accordingly, the second object 325 appears displayed on the display 151. In this case, the second object 325 may be a 2D or 3D object. Since the second object 325 has the same depth as the display 151, the depth of the second object 325 is 0.

The third and fourth objects 335 and 345 are exemplary 3D objects perceived as protruding toward the user from the display 151. It may be noted from the third and fourth objects 335 and 345 that the user feels different senses of perspective or different stereoscopic effects according to different disparities between left-eye images and right-eye images.

The third object 335 is created by combining a third left-eye image 331 (L3) with a third right-eye image 333 (R3), with a disparity d3 between the third left-eye and right-eye images 331 and 333. The user perceives the third object 335 as formed at the intersection between a line connecting the left eye 301 to the third left-eye image 331 and a line connecting the right eye 303 to the third right-eye image 333. Thus, the third object 335 appears before the display 151, that is nearer to the user. That is, the third object 335 is perceived as protruding toward the user from the display 151. As a 3D object perceived to the user as positioned before the display 151 is positive-signed in the embodiment of the present invention, the third object 335 has a positive depth value.

The fourth object 345 is created by combining a fourth left-eye image 341 (L4) with a fourth right-eye image 343 (R4), with a disparity d4 between the fourth left-eye and right-eye images 341 and 343. Herein, 'd3>d4'. The user perceives the fourth object 345 as formed at the intersection between a line connecting the left eye 301 to the fourth left-eye image 341 and a line connecting the right eye 303 to the fourth right-eye image 343. Thus, the fourth object 345 appears before the display 151 that is nearer to the user than the third object 335. That is, the fourth object 345 is perceived as protruding toward the user from the display 151. The fourth object 345 has a positive depth value.

The mobile communication terminal 10 may trick the user into perceiving an object formed by combining a left-eye image with a right-eye image as positioned behind or before the display 151 by adjusting the positions of the left-eye image and the right-eye image displayed on the display 151. Further, the mobile communication terminal 10 may control the depth of the object by adjusting the disparity between the left-eye image and the right-eye image.

As described above with reference to FIG. 6, the depth of an object formed by combining a left-eye image with a right-eye image may be positive-signed or negative-signed by adjusting the displayed positions of the left-eye image and the right-eye image. An object with a positive-signed depth value appears to the user as protruding from the display 151, whereas an object with a negative-signed depth value appears to the user as receding from the display 151.

As noted from FIG. 6, the depth of an object, that is, the distance between the display 151 and a position at which the user perceives a 3D image as formed may be changed according to the absolute value of the disparity between the left-eye and right-eye images of the object.

Figure 7:
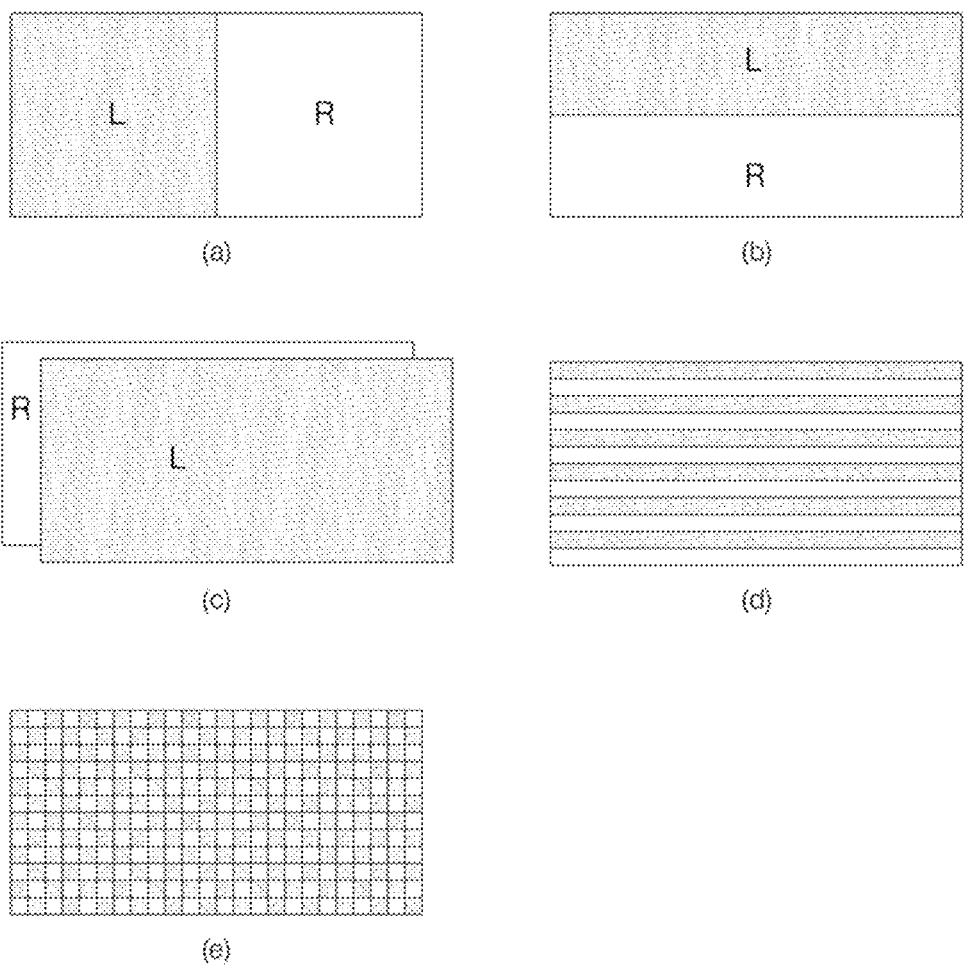
FIG. 7 illustrates 3D formats for 3D visualization.

FIG. 7 illustrates exemplary 3D formats for 3D visualization. The 3D formats may vary depending on the layouts of left-eye and right-eye images generated or received to display a 3D image.

The 3D formats are a side-by-side format (FIG. 7(*a*)), a top/bottom format (FIG. 7(*b*)), a frame sequential format (FIG. 7(*c*)), an interlaced format (FIG. 7(*d*)), and a checker box format (FIG. 7(*e*)). A left-eye image L and a right-eye image R are arranged side by side in the side by side format. The left-eye image L and the right-eye image R are stacked vertically in the top/bottom format, while they are arranged in time division in the frame sequential format. In the interlaced format, the left-eye image L and the right-eye image R alternate line by line. The left-eye image L and the right-eye image R are mixed on a box basis in the checker box format.

The controller 180 may identify the format of a mixed 3D video signal referring to a related data signal. The controller 180 may process the 3D video signal to be suitable for the identified format and output the processed 3D video signal to the display 151. If the display 151 is restricted to a specific 3D format, the controller 180 may convert the received 3D video signal to a form suitable for the 3D format and output the converted 3D video signal to the display 151. For video signal processing including 3D format identification and 3D video signal conversion and video signal outputting, the controller 180 may be provided with a formatter (not shown) for 3D visualization.

FIG. 8 illustrates a two-dimensional (2D) image and 3D images which are displayed according to an embodiment of the present invention. Especially, the 3D images will be described by classifying them into a 3D single-view image and a 3D multi-view image.

FIG. 8(*a*) illustrates a 2D image 410. As stated before, the 2D image 410 does not give a depth illusion and thus has a depth value of 0. The user perceives the 2D image 410 as displayed on the same plane with the display 151.

FIG. 8(*b*) illustrates a 3D single-view image 420. The 3D single-view image 420 gives a depth illusion to the user and thus has a depth value less than or larger than 0. As described before, a 3D image with a positive-signed depth value appears protruding from the display 151. The 3D single-view image 420 also has a positive-signed depth value, by way of example. Although the 3D single-view image 420 stereoscopically represents an object, it is an image of the object captured at one angle.

FIG. 8(*c*) illustrates 3D multi-view images 431 to 435. The 3D multi-view images 431 to 435 are 3D images of a specific object captured at various angles from virtual or actual viewpoints from which the object is viewed. For example, when 3D images of an object are captured at two or more angles and stored, the 3D multi-view images 431 to 435 may be generated according to the respective angles. Therefore, the 3D multi-view images 431 to 435 are 3D images captured from two or more viewpoints. Specifically, the 3D multi-view images 431 to 435 are a 3D image 431 taken from a first viewpoint, a 3D image 432 taken from a second viewpoint, a 3D image 433 taken from a third viewpoint, a 3D image 434 taken from a fourth viewpoint, and a 3D image 435 taken from a fifth viewpoint.

Figure 9:
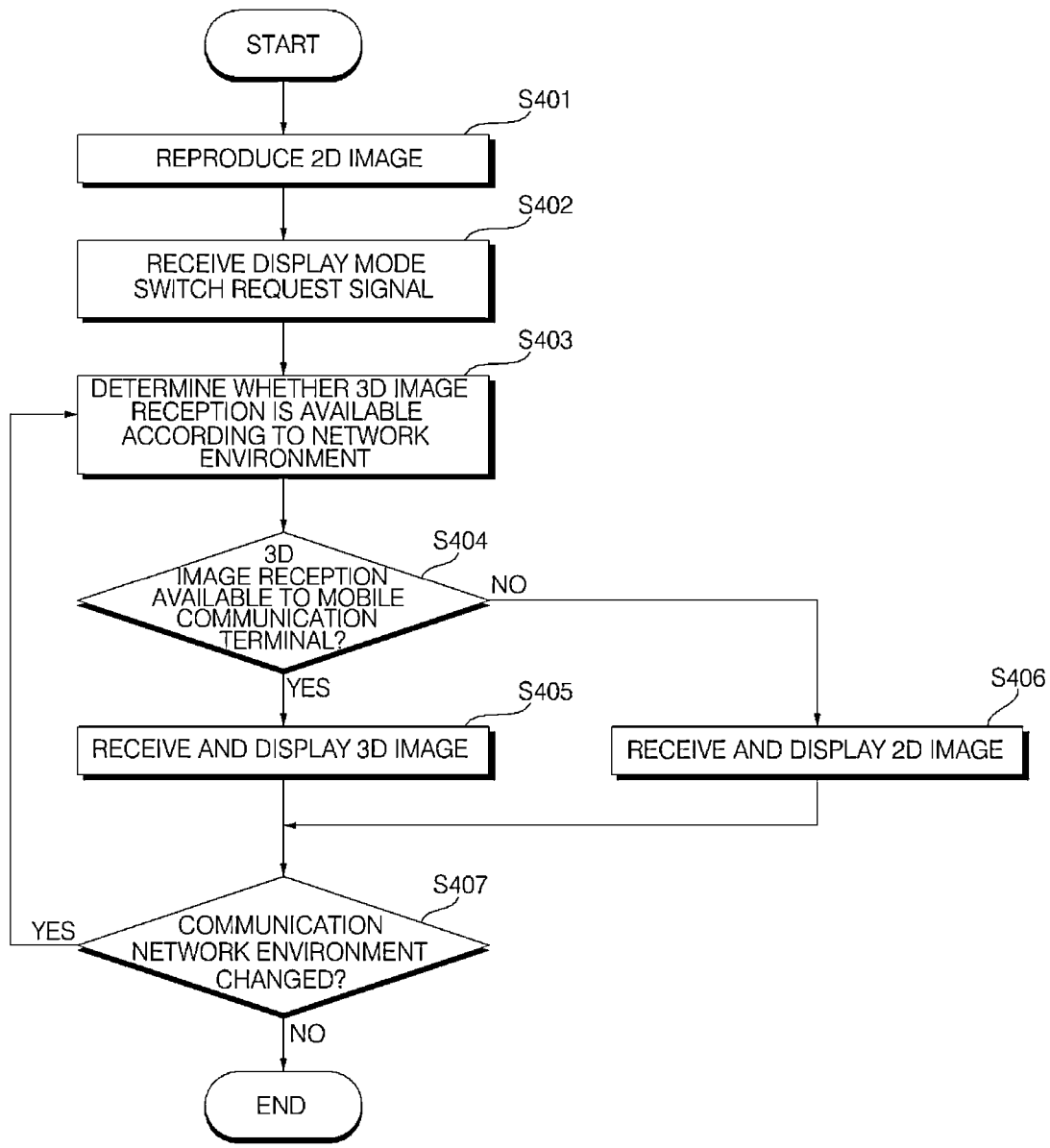
FIG. 9 is a flowchart illustrating a method for operating the mobile communication terminal according to an embodiment of the present invention.

FIG. 9 is a flowchart illustrating a method for operating the mobile communication terminal according to an embodiment of the present invention.

Referring to FIG. 9, a signal flow for display mode switching between the mobile communication terminal 10 and a server (not shown) is illustrated. The mobile communication terminal 10 may be connected to the server through a first communication network and/or a second communication network.

The mobile communication terminal 10 reproduces an image on the display 151 (S401). The image may be a 2D image or a 3D single-view image. Then the mobile communication terminal 10 receives a display mode switch request signal through the user input unit 130 (S402). The display mode switch request signal may be a user-input signal used to change the display mode of the mobile communication terminal 10 to one of a 2D display mode, a 3D single-view display mode, and a 3D multi-view display mode.

In accordance with the embodiment of the present invention, if the mobile communication terminal 10 is displaying a 2D image, the user may input the display mode switch request signal to view a 3D image. The 3D image may be one or more of a 3D single-view image and a 3D multi-view image. The display mode switch request signal may include information indicating a user-desired display mode.

Herein, the 2D image and the 3D image may originate from the same source or content, although they differ in display modes. In this case, the 2D image and the 3D image are same in content source information. Accordingly, the controller 180 may receive the content source information of the 2D image through the wireless communication module 110 over the first communication network from which the 2D image has been received. In addition, the controller 180 may receive a 3D image having the same content source information as that of the 2D image through the wireless communication module 110 by identifying the 3D image using the content source information of the 2D image. In this manner, for the same content, an image in one display mode can be switched to an image in another display mode and the error of receiving substantially different images can be prevented.

Upon receipt of the display mode switch request signal for displaying 3D images from the user, the controller 180 of the mobile communication terminal 10 determines whether 3D image reception is available, taking into account a network environment (S403). The controller 180 generates a 3D image request signal and transmits the 3D image request signal to the server through the wireless communication module 110. The server may transmit a 3D image response signal to the mobile communication terminal 10 in response to the 3D image request signal.

In addition, the controller 180 determines whether 3D image reception is available, taking into account the remaining battery power or memory capacity of the mobile communication terminal 10 (S404). If 3D image reception is available, the controller 180 receives a 3D image and stores it (S405). On the other hand, if 3D image reception is unavailable, the controller 180 may receive a 2D image instead of a 3D image and store the 2D image (S406).

The determination as to whether 3D image transmission is available may be made by the mobile communication terminal 10 or the server. In an embodiment of the present invention, the mobile communication terminal 10 may periodically or preliminarily acquire information about the current state of a communication network, a network environment, the amount of traffic, and channel load and may determine whether it can request and receive 3D images based on the acquired information. Only if 3D image reception is actively available, the mobile communication terminal 10 may transmit a 3D image request signal to the server.

To determine whether 3D image reception is available, the controller 180 of the mobile communication terminal 10 may use a network state value. Specifically, if the network state value is within a predetermined range, the controller 180 may determine that the mobile communication terminal 10 can receive 3D images through the wireless communication module 110. On the contrary, if the network state value is outside the predetermined range, the controller 180 may determine that the mobile communication terminal 10 cannot receive 3D images through the wireless communication module 110. The network state value is quantified information about the environment of a current connected communication network. The network state value may be determined according to one or more of the state of a channel established for data transmission and reception between the server and the mobile communication terminal 10, a data transmission rate, system load, and real-time traffic information.

If the mobile communication terminal 10 is connected to the second communication network or if the mobile communication terminal 10 can receive 3D images through one of the first and second communication networks within a predetermined time, the controller 180 may determine that 3D image reception is available. On the other hand, if the mobile communication terminal 10 is connected to the first communication network or if the mobile communication terminal 10 cannot receive 3D images through either the first communication network or the second communication network within the predetermined time, the controller 180 may determine that 3D image reception is unavailable.

In another embodiment of the present invention, the mobile communication terminal 10 may transmit a 3D image request signal to the server, upon user request. Then the server may determine whether 3D image transmission is available and notify the mobile communication terminal 10 of the determination result. The server may also take into account the amount of data to be transmitted, the type and state of a current communication network, and channel load in determining whether 3D image transmission is available.

If the mobile communication terminal 10 or the server determines that 3D image reception or transmission is available, the server transmits a 3D image to the mobile communication terminal 10. Herein, a 3D image response signal may be transmitted together with the 3D image. That is, the 3D image may be transmitted to the mobile communication terminal 10 in a data packet having a header that carries information indicating that an image of a changed display mode, a 3D multi-view image, or a 3D single-view image will be transmitted.

Meanwhile, the environment of the communication network may be changed while the mobile communication terminal 10 is receiving a 2D image or a 3D image. When a change occurs to the state of the mobile communication terminal 10 as well as the environment of the communication network, the controller 180 may determine whether 3D image reception is available and change the current display mode according to the determination (S407). That is, if the environment of the communication network gets better during reception and reproduction of a 2D image or if the mobile communication terminal 10 is connected to the second communication network, the controller 180 may switch the display mode to a 3D display mode. In contrast, if the environment of the communication network gets poor during 3D image reception and reproduction, the remaining battery power of the mobile communication terminal 10 is dropped to or below a predetermined value, or there is a lack in the available memory capacity of the mobile communication terminal 10, the controller 180 may switch the 3D display mode to the 2D display mode.

Accordingly, when determining that the communication network environment has been changed, the controller 180 may determine whether 3D image reception is available and receive image data according to the network environment.

Meanwhile, along with improved functions and functional development of mobile communication terminals, a plurality of applications may be executed simultaneously. For example, a plurality of Packet Switched (PS) data calls demanding simultaneous execution may be connected to different Packet Data Networks (PDNs) that provide their respective services with different QoS levels.

However, 2D and 3D images for different display modes may be received from the same PDN because they originate from the same content. Therefore, even though the 2D image is received through the first communication network and the 3D image is received through the second communication network, the first and second communication networks may be connected to the same PDN.

Figure 10:
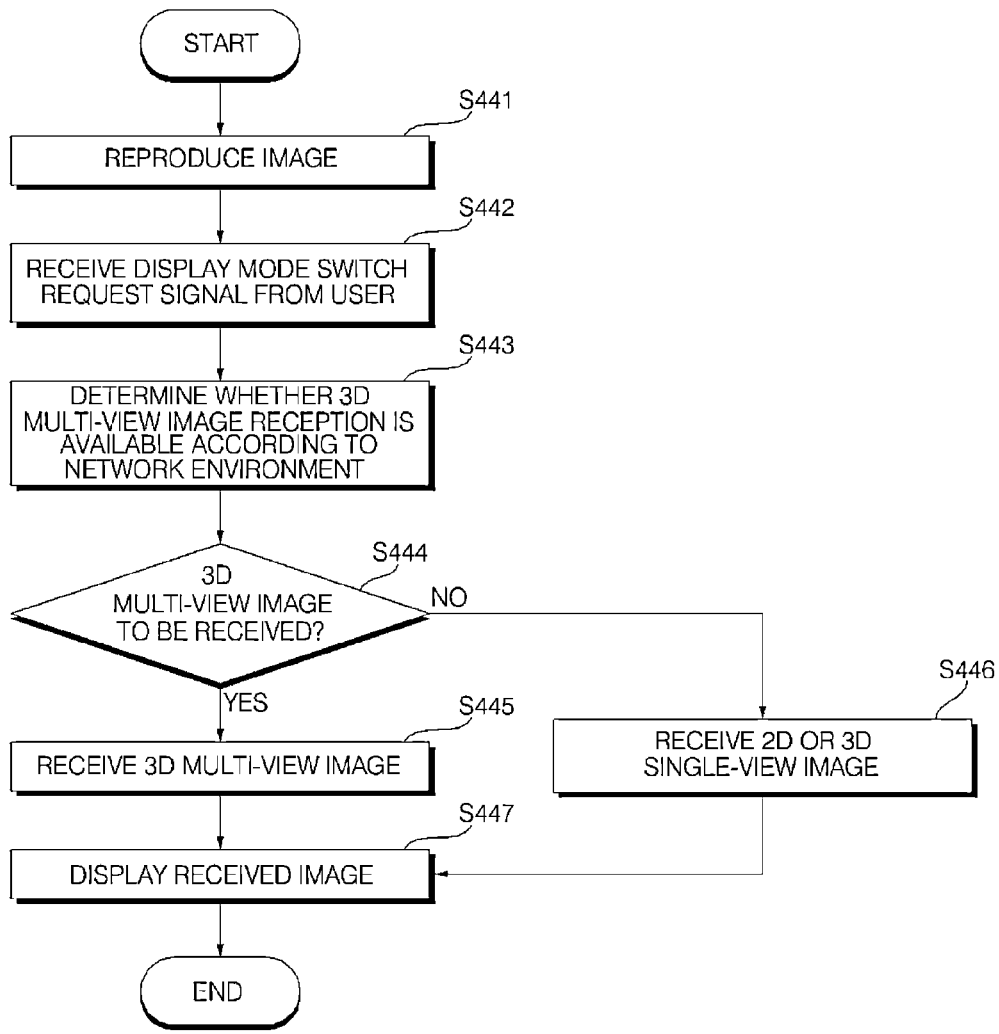
FIG. 10 is a flowchart illustrating a method for operating the mobile communication terminal according to another embodiment of the present invention.

FIG. 10 is a flowchart illustrating a method for operating the mobile communication terminal according to another embodiment of the present invention.

Referring to FIG. 10, the mobile communication terminal 10 is responsible for determining whether a current communication network environment allows 3D multi-view image transmission.

The mobile communication terminal 10 reproduces an image on the display 151 (S441). The image may be a 2D image or a 3D single-view image. Then the mobile communication terminal 10 may receive a user-input signal requesting display mode switching for 3D multi-view images through the user input unit 130 (S442). The display mode switch request signal may be a user-input signal used to transition the mobile communication terminal 10 to a display mode switching mode by temporarily discontinuing current image reproduction and providing a menu of available display modes.

Or the display mode switch request signal may include information indicating a display mode to be switched to. The controller 180 of the mobile communication terminal 10 compares a display mode indicated by a user-input display mode selection signal with the display mode of a current reproduced image. If the two display modes are different, the controller 180 may recognize the display mode selection signals as a display mode switch request signal.

Upon receipt of the display mode switch request signal for 3D multi-view images from the user, the controller 180 of the mobile communication terminal 10 determines whether 3D multi-view image reception is available (S443). The mobile communication terminal 10 may receive information about a network state from the server, upon receipt of the display mode switch request signal or periodically. The network state information may include information indicating whether a current connected communication network is a 3G network or an LTE network, information about a data transmission rate, information about real-time traffic, and channel state information.

The controller 180 may estimate a time taken for downloading 3D multi-view images. If the estimated time exceeds a predetermined time, the controller 180 may determine that 3D multi-view image reception is unavailable. Or if the mobile communication terminal 10 is connected to the legacy network, that is, the first communication network, the controller 180 may determine that 3D multi-view image reception is unavailable. If the mobile communication terminal 10 is connected to the LTE network, that is, the second communication network, the controller 180 may determine that 3D multi-view image reception is available.

Simultaneously with reception of the information, the controller 180 may determine whether to receive 3D multi-view images, further taking into account the capacity of the memory 160 or the remaining battery power of the mobile communication terminal 10 (S444). That is, if the remaining capacity of the memory 160 is not sufficient for storing received 3D multi-view images, the controller 180 may determine that 3D multi-view image reception is unavailable and display a message notifying that 3D multi-view image reception is unavailable. Or the controller 180 may display a warning message concerning the memory capacity so that the user may secure a memory capacity by deleting other files or connecting the mobile communication terminal 10 to an external memory.

If the battery power of the power supply 190 is not sufficient for downloading a large file such as 3D multi-view images and reproducing it, the controller 180 may determine that 3D multi-view image reception is unavailable.

When determining to receive 3D multi-view images, taking into comprehensive account the network environment and internal factors of the mobile communication terminal 10, the controller 180 receives 3D multi-view images (S445). In case of a video, the controller 180 may receive a remaining video part to be reproduced in 3D multi-view images or may receive all of the video including an already reproduced part in 3D multi-view images. On the other hand, if the controller 180 determines that 3D multi-view image reception is unavailable or not preferable according to the current network state, the controller 180 receives a 2D image or a 3D single-view image (S446) and the display 151 reproduces and displays the received image (S447).

Even though the display mode is switched to the 3D multi-view mode, if the remaining battery power drops to or below a predetermined value during downloading all of 3D multi-view images and reproducing them, the controller 180 may display a related warning message. More battery power may be consumed for reproducing 3D multi-view images than 2D images or 3D single-view images. Thus, if the remaining battery power drops to or below the predetermined value, the mobile communication terminal 10 may display a menu screen asking whether to switch to the 2D or 3D single-view display mode and may prompt the user to select a display mode. Or if the remaining battery power drops to or below the predetermined value, the controller 180 may automatically switch to a display mode that consumes less battery power according to presetting of the mobile communication terminal 10.

For example, the controller 180 periodically monitors the remaining battery power during image reproduction. If the remaining battery power is between 10% and 30%, the controller 180 may switch to the 3D single-view display mode, for image reproduction. If the remaining battery power is below 10%, the controller 180 may switch to the 2D display mode, for image reproduction. If the remaining battery power increases to or above a reference value during reproduction of a 2D image or a 3D single-view image, the controller 180 may return to the 3D multi-view display mode.

In addition, if the remaining battery power drops to or below a predetermined value during the 3D single-view image reproduction, the controller 180 may switch to the 2D display mode. If the remaining battery power rises to or above a predetermined value during the 3D single-view image reproduction, the controller 180 may switch to the 3D multi-view image display mode.

Figure 11:
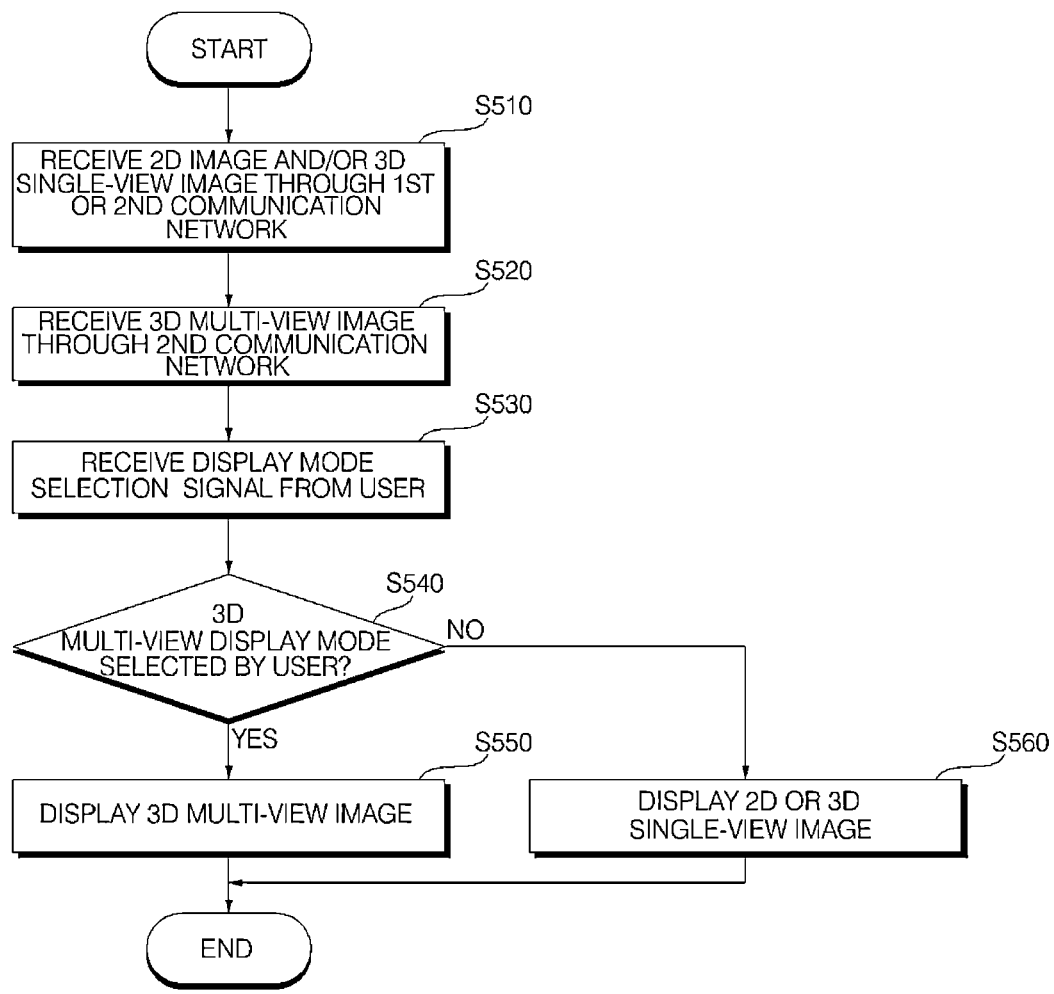
FIG. 11 is a flowchart illustrating a method for operating the mobile communication terminal according to another embodiment of the present invention.

FIG. 11 is a flowchart illustrating a method for operating the mobile communication terminal according to another embodiment of the present invention.

Referring to FIG. 11, the wireless communication module 110 of the mobile communication terminal 10 receives a 2D image and/or a 3D single-view image through the first or second communication network (S510) and receives 3D multi-view images through the second communication network (S520).

For example, the first communication network may be a 3G network and the second communication network may be an LTE network. The second communication network may be superior to the first communication network in terms of the amount of transmitted data, a data transmission rate, and communication quality. The mobile communication terminal 10 may access the first and second communication networks simultaneously or sequentially by handover. In the case where the mobile communication terminal 10 simultaneously accesses the first and second communication networks, the mobile communication terminal 10 may be a terminal capable of Multiple Input Multiple Output (MIMO) communication using two or more antennas. That is, the embodiment of the present invention may cover a case where the mobile communication terminal 10 is connected to the second communication network after being connected to the first communication network and a case where the mobile communication terminal 10 is additionally connected to the second communication network while being connected to the first communication network.

The mobile communication terminal 10 may receive 2D images, 3D single-view images, and 3D multi-view images in various manners such as streaming, downloading, broadcasting, etc.

As described before, 3D multi-view images are 3D images captured or generated at different angles from the same content. Because of the presence of a 3D image per viewpoint, more data is transmitted during 3D multi-view image transmission than during 3D single-view image transmission as well as 2D image transmission.

The mobile communication terminal 10 receives a display mode selection signal from the user through the user input unit 130 (S530). The display mode selection signal is a user-input signal for selecting a display mode to view a 2D image, a 3D single-view image, or 3D multi-view images. The mobile communication terminal 10 may display an image in one of the 2D display mode, the 3D single-view display mode, and the 3D multi-view display mode according to the display mode selection signal.

To receive the display mode selection signal, the controller 180 may generate a menu image, thumbnail images, a progress bar, etc. and may output them on the display 151.

In accordance with an embodiment of the present invention, when the mobile communication terminal 10 is connected to the second communication network, the controller 180 receives a 2D image, a 3D single-view image, and 3D multi-view images through the wireless communication module 110, prompts the user to select a display mode, and displays an image according to the selected display mode. Meanwhile, it may further be contemplated as another embodiment that when the mobile communication terminal 10 is connected to the second communication network, the user first sets a display mode and then the controller 180 receives only an image matching to the user-set display mode and displays the received image.

The controller 180 determines whether the user has selected the 3D multi-view display mode (S540). Upon user selection of the 3D multi-view display mode, the multimedia player 181 of the controller 180 processes 3D multi-view images and outputs the processed 3D multi-view images to the display 151 and the display 151 displays the 3D multi-view images (S550).

On the other hand, if the user has not selected the 3D multi-view display mode, that is, the user has selected the 2D display mode or the 3D single-view display mode, the mobile communication terminal 10 displays a 2D image or a 3D single-view image on the display 151 (S560).

The embodiment of the present invention illustrated in FIG. 11 may include both a case where a display mode is changed during reproducing a 2D or 3D single-view image and thus 3D multi-view images are reproduced and displayed in the changed display mode and a case where a user presets a display mode for viewing an image before image reproduction and thus 3D multi-view images are reproduced according to the preset display mode.

Figure 12:
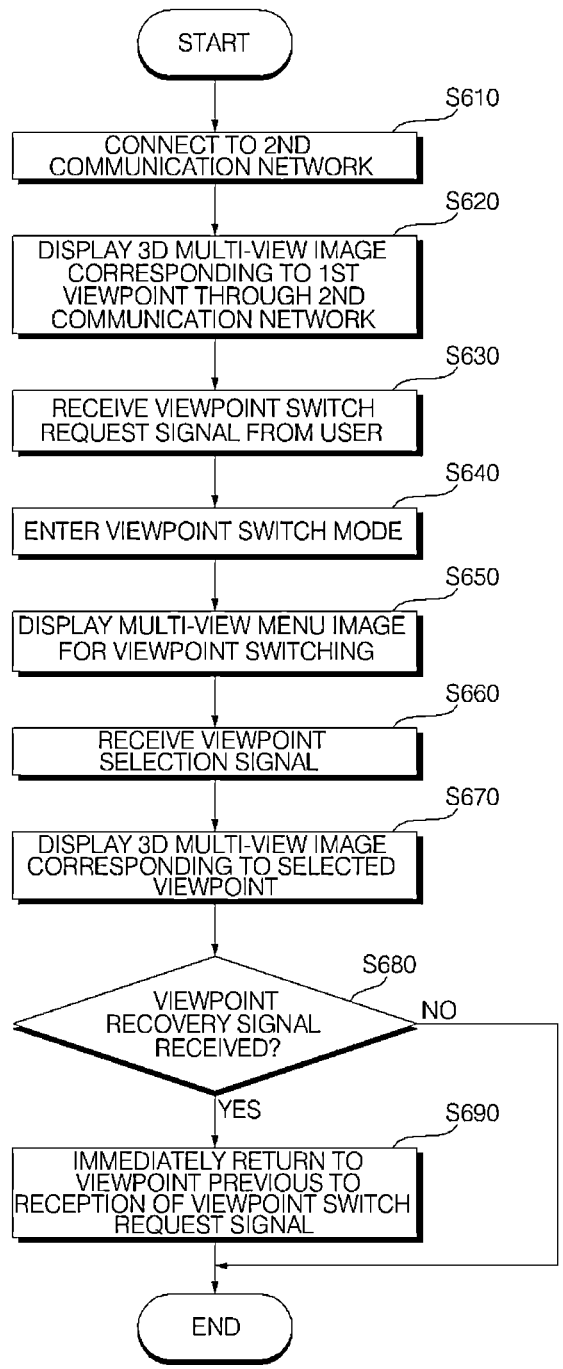
FIG. 12 is a flowchart illustrating a method for operating the mobile communication terminal according to another embodiment of the present invention.

FIG. 12 is a flowchart illustrating a method for operating the mobile communication terminal according to another embodiment of the present invention.

Referring to FIG. 12, the mobile communication terminal 10 is connected to the second communication network through the wireless communication module 110 (S610). The mobile communication terminal 10 may be connected to both the first and second communication networks or only to the second mobile communication network.

As the mobile communication terminal 10 is connected to the second communication network, it receives 3D multi-view images of the same content. When the user selects the 3D multi-view display mode, the mobile communication terminal 10 processes a 3D multi-view image taken from one of a plurality of viewpoints and reproduces and displays the processed 3D multi-view image on the display 151.

For example, a 3D multi-view image taken from a first viewpoint, received from the second communication network may be displayed (S620). During reproduction of the 3D multi-view image, it is possible to switch to another viewpoint. That is, when the user views 3D multi-view images, the user can view one object in 3D images from a plurality of viewpoints. The 3D multi-view images may be received by streaming, downloading, or broadcasting to which the present invention is not limited.

To switch to another viewpoint, the user may input a user command to the mobile communication terminal 10. The mobile communication terminal 10 receives a viewpoint switch request signal from the user (S630). The viewpoint switch request signal may be input in various manners. The user may input the viewpoint switch request signal by making one touch or a plurality of touches on the display 151 that is reproducing a 3D multi-view image, making a multi-touch on two or more spots of the display 151, making an air touch, or inputting a voice signal according to presetting of the mobile communication terminal 10. Or when the mobile communication terminal 10 is connected to the second communication network or receives a 3D multi-view image, the controller 180 may display an object indicating that viewpoint switching is available in the form of a button in an area of the display 151, so as to allow the user to input a viewpoint switch request signal using the object.

Upon receipt of the viewpoint switch request signal during reproduction of the 3D multi-view image, the mobile communication terminal 10 enters a viewpoint switch mode (S640). If the 3D multi-view image is from a video, the multimedia player 181 of the controller 180 may temporarily discontinue the video reproduction to switch to another viewpoint, when entering the viewpoint switch mode.

The controller 180 may generate a multi-view menu image for viewpoint switching and output the multi-view menu image to the display 151, and the display 151 may display the multi-view menu image (S650). The multi-view menu image may be an object for receiving a user touch and generating a control signal for viewpoint switching according to the user touch. For example, the multi-view menu image may take various forms such as an arrow along a rotation direction around two or more viewpoints with respect to an object, two or more arrows indicating the directions of viewpoints, virtual cameras displayed at the positions of viewpoints, or thumbnails of 3D multi-view images taken from different viewpoints.

The user input unit 130 of the mobile communication terminal 10 receives a viewpoint selection signal on the multi-view menu image from the user (S660). One of two or more viewpoints may be selected according to the viewpoint selection signal and then a 3D multi-view image corresponding to the selected viewpoint may be displayed on the display 151 (S670).

After the viewpoint switching, a viewpoint recovery signal may be received (S680). Upon receipt of the viewpoint recovery signal, the viewpoint previous to input of the viewpoint switch request signal is recovered immediately (S690). The viewpoint recovery signal may also be input to the user input unit 130 by means of per-viewpoint-based thumbnails or an object or menu image generated for inputting the viewpoint recovery signal. Alternatively or additionally, if a timer is activated and a preset signal such as a multi-touch or a double touch is received within a predetermined time after receiving the viewpoint switch request signal, the controller 180 may determine the preset signal as the viewpoint recovery signal, recover the viewpoint previous to the viewpoint switching, and reproduce a 3D multi-view image corresponding to the viewpoint.

If the viewpoint recovery signal is not received, the display 151 continues to display the 3D multi-view image corresponding to the switched viewpoint.

Figure 13:
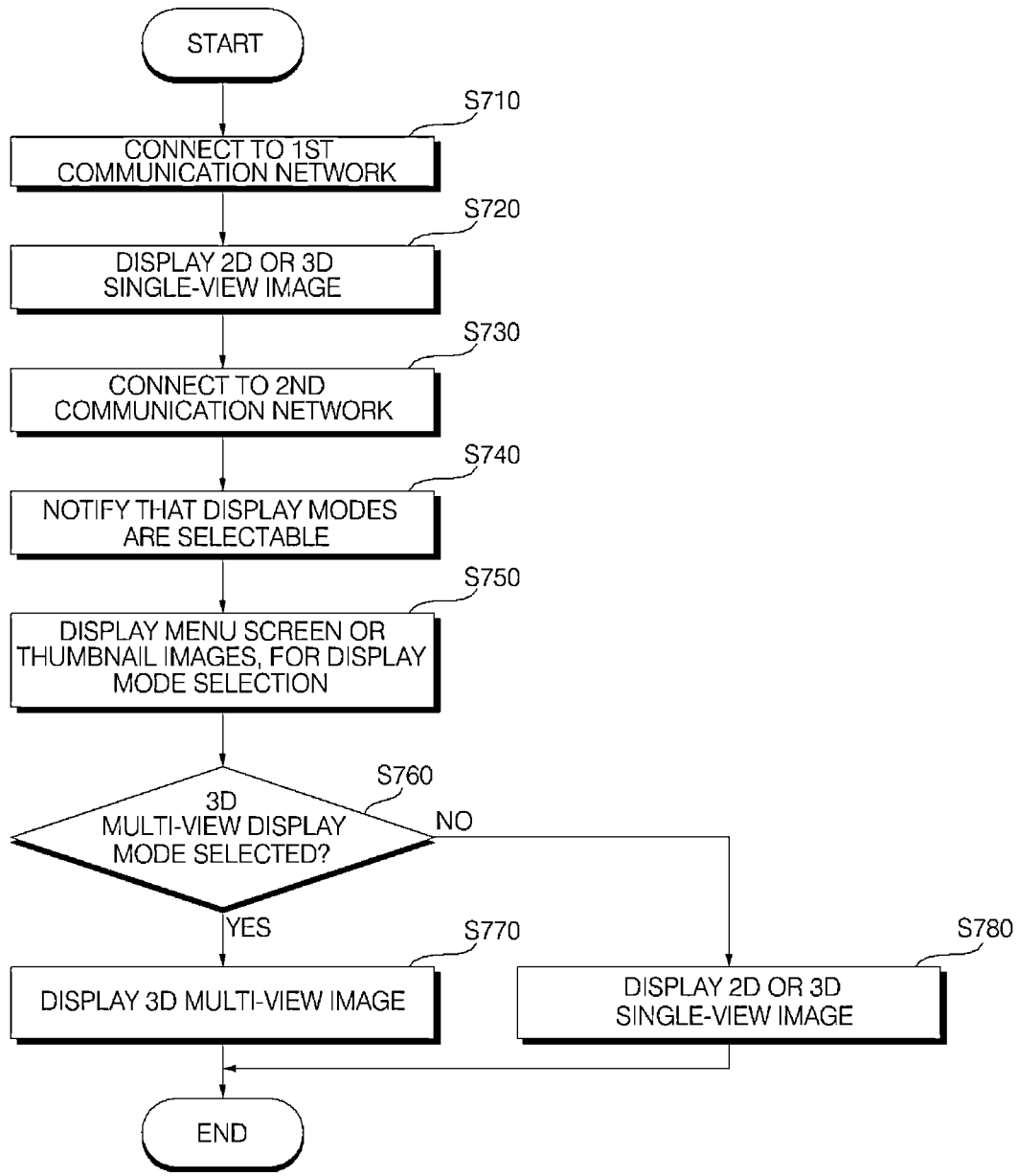
FIG. 13 is a flowchart illustrating a method for operating the mobile communication terminal according to another embodiment of the present invention.

FIG. 13 is a flowchart illustrating a method for operating the mobile communication terminal according to another embodiment of the present invention. The embodiment of the present invention as described below with reference to FIG. 13 is based on the assumption that a communication network connected to the mobile communication terminal 10 is changed during image reproduction.

Referring to FIG. 13, the mobile communication terminal 10 is connected to the first communication network (S710). While it keeps connected to the first mobile communication network, the mobile communication terminal 10 receives a 2D image or a 3D single-view image and displays the received image on the display 151 (S720).

While the mobile communication terminal 10 is displaying the 2D or the 3D single-view image, it is connected to the second communication network through the wireless communication module 110 (S730). The mobile communication terminal 10 may be connected to the second communication network through the wireless communication module 110 for the reason of handover from coverage movement or failure in the first communication network. When the mobile communication terminal 10 is connected to the second communication network, the controller 180 visually or audibly notifies that a display mode can be selected through the display 151, the audio output module 153, the alarm emitter 155, or a vibration module (not shown) (S740).

After notifying the user that a display mode can be selected, the controller 180 may generate a menu screen or thumbnail images for display mode selection on the display 151 (S750). Thus the user may select a display mode using the menu screen or thumbnail images.

The controller 180 identifies the user-selected display mode (S760). If the 3D multi-view display mode is selected, the controller 180 displays a 3D multi-view image (S770). If the user has not selected any particular display mode despite connection to the second communication network or if the 3D multi-view display mode has not been selected, the controller 180 continues to reproduce a 2D image or a 3D single-view image and display it on the display 151 (S780). Even though the 3D single-view display mode is selected, a 3D single-view image may be displayed with improved communication quality of multimedia content such as fast buffering, less video interruption, high resolution, or improved sound quality, over the second communication network than over the first communication network.

Figure 14:
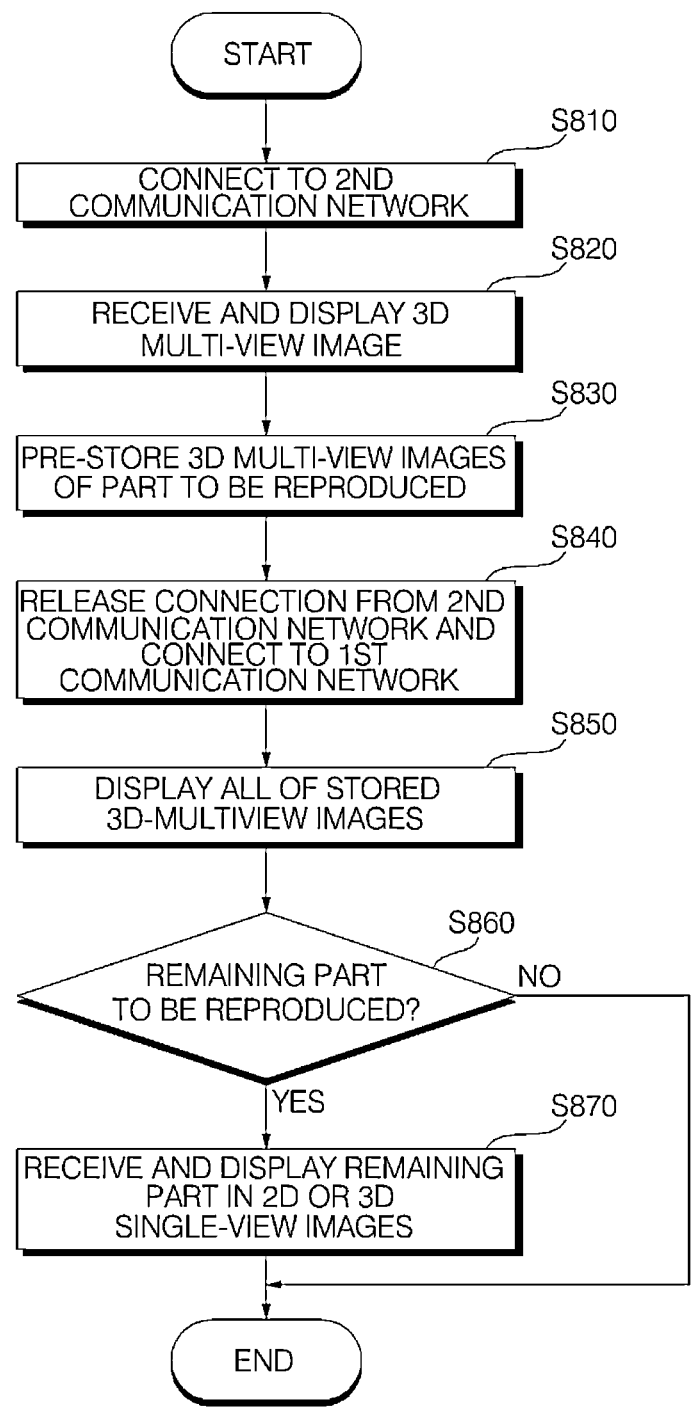
FIG. 14 is a flowchart illustrating a method for operating the mobile communication terminal according to a further embodiment of the present invention.

FIG. 14 is a flowchart illustrating a method for operating the mobile communication terminal according to a further embodiment of the present invention.

Referring to FIG. 14, the mobile communication terminal 10 is connected to the second communication network, receives 3D multi-view images through the second communication network, and displays the 3D multi-view images (S810 and S820). In the embodiment of the present invention, the 3D multi-view images may be received by streaming.

The controller 180 pre-stores 3D multi-view images following a current reproduction time in the memory 160 (S830). That is, the controller 180 receives a current streamed part and reproduces the received part, while preliminarily buffering following images yet to be displayed, in preparation for the case where the mobile communication terminal 10 is disconnected from the second communication network.

While 3D multi-view images are being reproduced by streaming, the mobile communication terminal 10 is disconnected from the second communication network and instead, is connected to the first communication network (S840). After the moment of connecting to the first communication network, the controller 180 reproduces the 3D multi-view images pre-stored in step S830 and displays them (S850).

The controller 180 determines whether there is any 3D multi-view image remaining to be reproduced after the stored part (S860). That is, the controller 180 determines whether there still remains a part to be reproduced after displaying all of the stored 3D multi-view images or an entire clip of images have been completely reproduced.

In the presence of a remaining part to be reproduced, the controller 180 may receive 2D images or 3D single-view images of the remaining part and display them on the display 151 (S870). Before reproducing the remaining part in 2D images or 3D single-view images, the controller 180 may output a menu screen and receive a user signal indicating a display mode selected from the menu screen by the user. The user may input a display mode selection signal on the menu screen and the controller 180 may reproduce the remaining part by 2D image streaming, 3D single-view image streaming, or 3D single-view or multi-view image downloading according to the display mode selection signal.

FIGS. 15 to 32 illustrate exemplary operations of the mobile communication terminal for providing 3D multi-view images or controlling viewpoints according to embodiments of the present invention.

Figure 15:
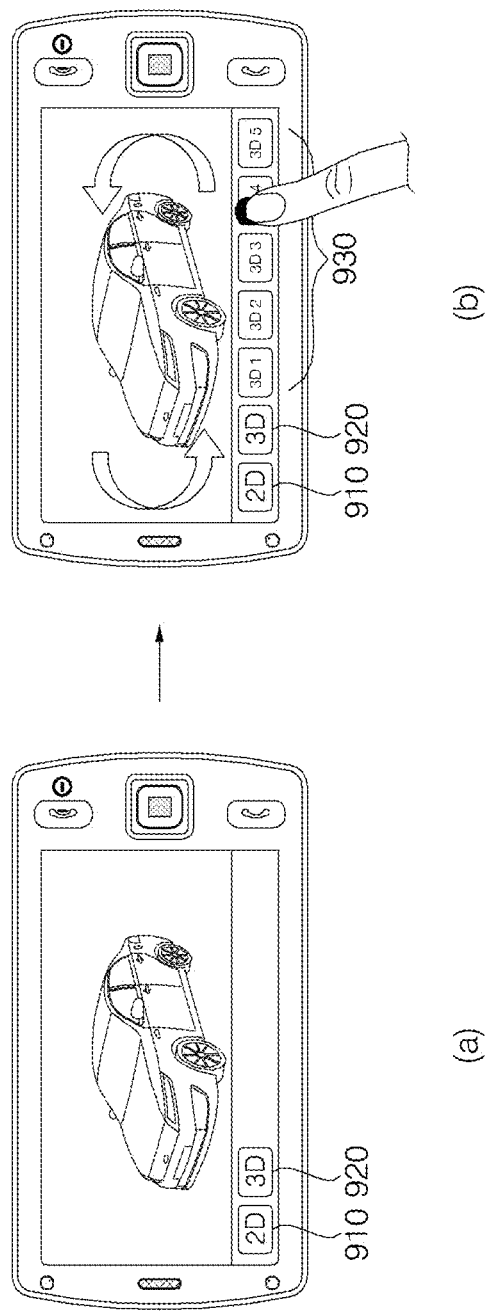

Referring to FIG. 15, as the mobile communication terminal 10 is connected to the second communication network, it may display 3D multi-view images to a user and thus display a UI to allow the user to select the 3D multi-view display mode. The UI may include menu items corresponding to available display modes.

FIG. 15(*a*) illustrates a UI for display mode selection in the case where the mobile communication terminal 10 is connected to the first communication network. Referring to FIG. 15(*a*), if the mobile communication terminal 10 is connected only to the first communication network, a 2D display mode menu item 910 and a 3D single-view display mode menu item 920 are displayed in a lower part of a screen of the mobile communication terminal 10.

FIG. 15(*b*) illustrates a UI for display mode selection in the case where the mobile communication terminal 10 is connected to the second communication network. Referring to FIG. 15(*b*), the mobile communication terminal 10 connected to the second communication network may reproduce images captured from a plurality of viewpoints in the 3D multi-view display mode as well as it may reproduce images in the 2D display mode or the 3D single-view display mode. Accordingly, the UI may also include the 2D display mode menu item 910, the 3D single-view display mode menu item 920, and 3D multi-view display mode menu items 930.

While the mobile communication terminal 10 is not connected to the second communication network, the 3D multi-view display mode menu items 930 may be displayed blurry or semi-transparent. Once the mobile communication terminal 10 is connected to the second communication network, the 3D multi-view display mode menu items 930 may be displayed bold or opaque. In addition, the 3D multi-view display mode menu items 930 may be activated or deactivated depending on the connected or disconnected state of the mobile communication terminal to the second communication network.

In FIG. 15(*b*), arrows displayed on both sides of the screen are an exemplary UI to allow the user to select an intended viewpoint, as stated before. When a 3D multi-view image is displayed, the user may preview a 3D multi-view image on a viewpoint basis by rotating the displayed image in an arrowed direction.

Figure 16:
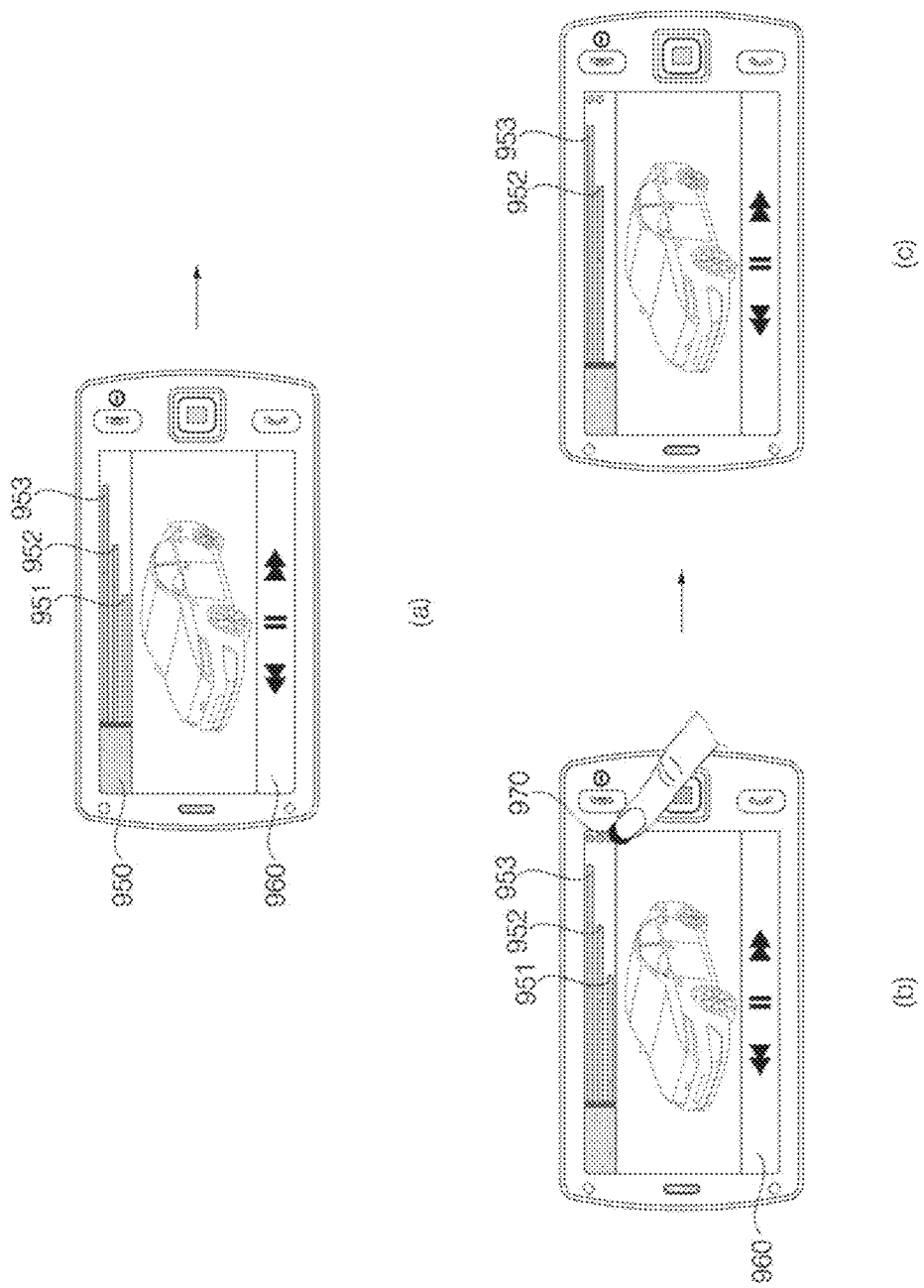

FIG. 16 illustrates screens that display the buffering states of 2D images, 3D single-view images, and 3D multi-view images according to an embodiment of the present invention.

Referring to FIG. 16, the mobile communication terminal 10 is connected to the second communication network and thus is capable of reproducing and displaying any of 2D, 3D single-view, and 3D multi-view images. That is, the user may select one or more of the 2D display mode, the 3D single-view display mode, and the 3D multi-view display mode. If the buffering state of each image type is displayed to the user, the user may take into account the buffering states of the images in selecting a display mode.

Specifically, along with a progress bar 950 indicating a reproduction progress, the controller 180 may generate and display buffering progress bars 951, 952 and 953 to respectively indicate the individual buffering states of the 3D multi-view images, the 3D single-view images, and the 2D images on the display 151.

Referring to FIG. 16(*a*), the individual buffering progress bars 951, 952 and 953 are displayed in an upper part of the screen, along with a main image and the progress bar 950 indicating the reproduction progress of the main image. A UI is displayed in a lower part of the screen, for controlling images. Herein, the images may be one of 2D images, 3D singe-view images, and 3D multi-view images.

Referring to FIG. 16(*b*), the user may cancel buffering of unintended images. For example, if the user does not view 3D multi-view images, there is no need for buffering them. Thus, the user may cancel buffering of the 3D multi-view images by deleting the buffering progress bar 951.

Referring to FIG. 16(*c*), as the user cancels buffering of the 3D multi-view images, the buffering progress bar indicating the buffered amount of 3D multi-view images is not shown.

Figure 17:
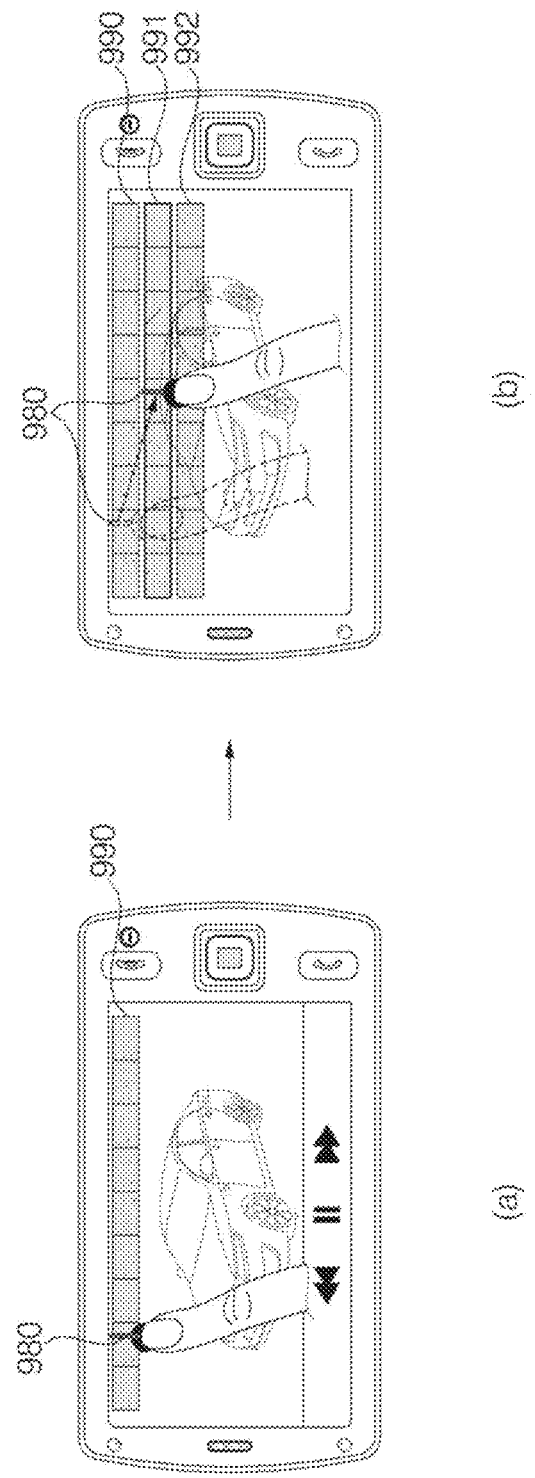

FIG. 17 illustrates a progress bar composed of thumbnails. The thumbnail progress bar indicates a current reproduction time by a cursor 980 on a thumbnail list arranged in a direction.

Referring to FIG. 17, a thumbnail list 990 taking the form of a progress bar may be extended. For the convenience' sake, an initially displayed thumbnail list is referred to as a first thumbnail list 990. If a 3D multi-view image is being reproduced, the first thumbnail list 990 may be extended to thumbnail lists corresponding to various viewpoints. Alternatively, the first thumbnail list 990 may be extended to thumbnail lists corresponding to different display modes. The extended thumbnail lists are illustrated in FIG. 17(*b*).

Specifically, if the first thumbnail list 990 is a progress bar that shows thumbnails of 2D images and a current reproduction time, the extension of the thumbnail list 990 may include second and third thumbnail lists 991 and 992. The second thumbnail list 991 may be a progress bar including thumbnails of 3D singe-view images and a current reproduction time and the third thumbnail list 992 may be a progress bar including thumbnails of 3D multi-view images and a current reproduction time.

Or all of the first, second, and third thumbnail lists 990, 991 and 992 may include thumbnails and progress bars of 3D multi-view images. In this case, the first, second, and third thumbnail lists 990, 991 and 992 may be progress bars that include the thumbnails of 3D multi-view images and indicate a current reproduction time according to viewpoints. That is, the first thumbnail list 990 may be a progress bar which includes the thumbnails of 3D multi-view images captured from a first viewpoint and indicates a current reproduction time, the second thumbnail list 991 may be a progress bar which includes the thumbnails of 3D multi-view images captured from a second viewpoint and indicates a current reproduction time, and the third thumbnail list 992 may be a progress bar which includes the thumbnails of 3D multi-view images captured from a third viewpoint and indicates a current reproduction time.

As illustrated in FIG. 17(*b*), if the user drags and drops the cursor, the user may change a display mode and/or a viewpoint as well as a video reproduction time.

Figure 18:
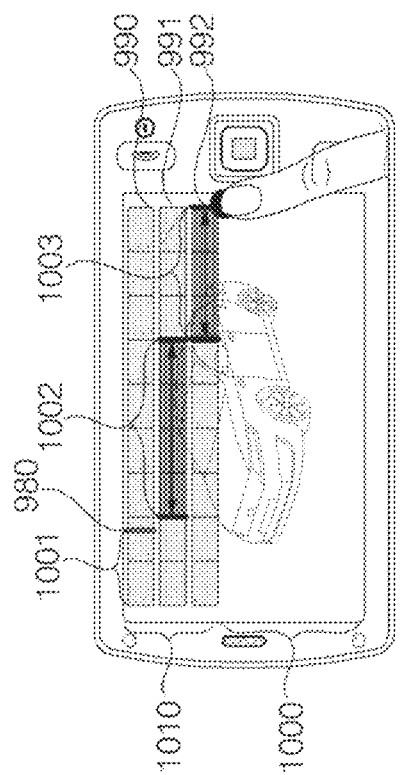

FIG. 18 illustrates an operation for setting buffering parts using buffering progress bars. The buffering progress bars may be formed by arranging thumbnails in the order of reproduction time points.

For the same content, 2D images may be buffered for a first part 1001, 3D single-view images may be buffered for a second part 1002, and 3D multi-view images may be buffered for a third part 1003 by dragging or touching buffering progress bars corresponding to display modes.

For example, a user-preset part that is most interesting part or most stereoscopic part of a movie may be buffered in 3D single-view images or 3D multi-view images and the other part of the movie may be buffered in 2D or 3D single-view images, for fast buffering and reproduction.

Herein, a progress bar indicating a reproduction time or a progress bar indicating the amount of buffered images may be formed with thumbnail images arranged on the time line.

Figure 19:
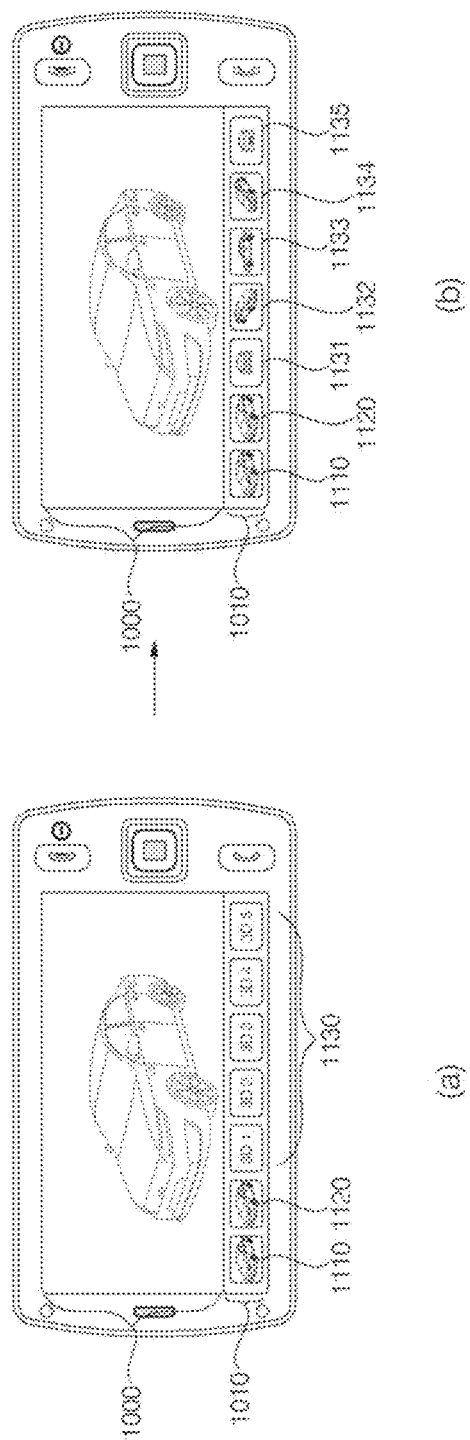
Figure 20:
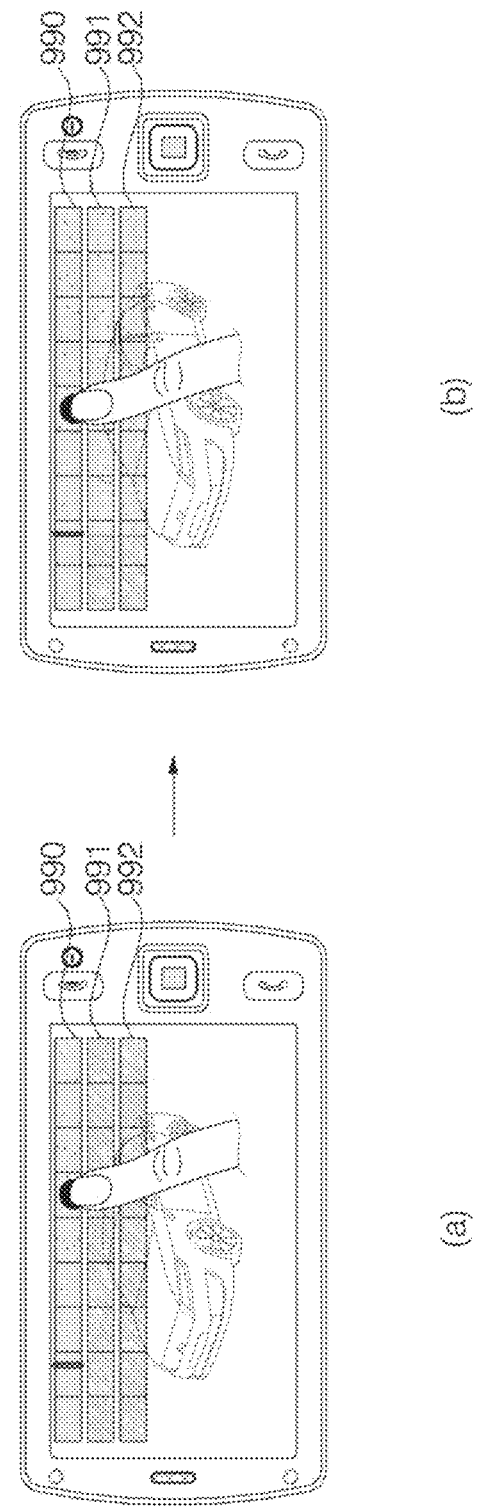
Figure 21:
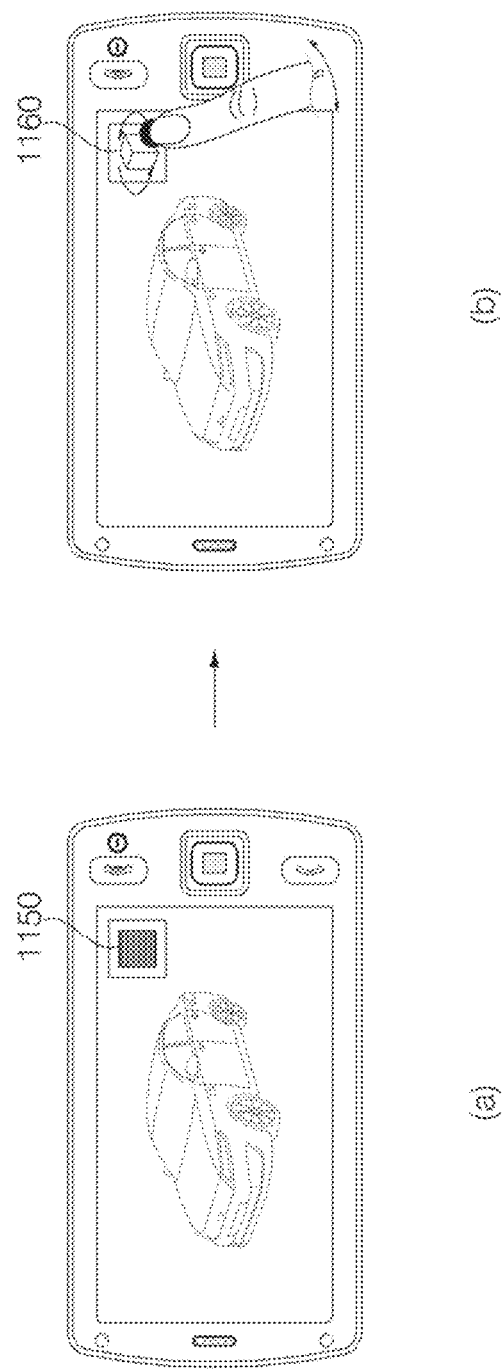

FIGS. 19, 20 and 21 illustrate exemplary methods for displaying a UI, a menu, or an object to indicate that the 3D multi-view display mode is available and to allow the user to select a viewpoint, in the case where the 3D multi-view display mode is available due to connection to the second communication network.

FIGS. 19 and 20 illustrate menu items or menu images for selecting display modes, which are turned on/off or illuminated/dimmed according to connection to the first or second communication network.

Referring to FIG. 19, a main image is displayed in a first area 1000 and thumbnail images are displayed in a second area 1010 on the screen of the mobile communication terminal 10. The user may preview per-display mode-based images and per-viewpoint-based images from the thumbnail images. The user may select a display mode and/or a viewpoint by inputting a signal that selects a thumbnail corresponding to the display mode and/or the viewpoint. The thumbnail images serve as menu items, including a 2D thumbnail image 1110, a 3D single-view thumbnail image 1120, and 3D multi-view thumbnail images 1130.

Referring to FIG. 19(*a*), when the mobile communication terminal 10 is connected only to the first communication network, the mobile communication terminal 10 displays the 2D thumbnail image 1110 and the 3D single-view thumbnail image 1120. Even though the 3D multi-view thumbnail images 1130 are displayed in FIG. 19(*a*), the 3D multi-view thumbnail images 1130 are deactivated or dimmed.

Referring to FIG. 19(*b*), when the mobile communication terminal 10 is connected to the second communication network, the mobile communication terminal 10 displays the 2D thumbnail image 1110, the 3D single-view thumbnail image 1120, and the 3D multi-view thumbnail images 1130.

All of the 2D thumbnail image 1110, the 3D single-view thumbnail image 1120, and the 3D multi-view thumbnail images 1130 are displayed activated. As the 3D multi-view function is enabled, 3D multi-view thumbnail images 1131 to 1135 corresponding to first to fifth viewpoints are displayed activated in the thumbnail list. The user may select a display mode and a viewpoint by selecting one of the thumbnails.

FIG. 20 illustrates extension of a thumbnail list or a progress bar, especially when there is an available display mode option according to a network state.

Referring to FIG. 20(*a*), if the first communication network supports only the 2D display mode, only the progress bar 990 for 2D images is displayed activated. If the mobile communication terminal 10 is connected to the second communication network later and receives a user input according to a presetting, the mobile communication terminal 10 may additionally display the 3D single-view progress bar 991 corresponding to the available 3D single-view display mode and/or the available 3D multi-view progress bar 992 corresponding to the available 3D multi-view display mode, or may activate the deactivated 3D single-view progress bar 991 and/or the deactivated 3D multi-view progress bar 992.

Referring to FIG. 21, as the mobile communication terminal 10 is connected to the second communication network, an object for viewpoint switching is changed. As the shape of the object for viewpoint switching is changed, the user may be aware that the mobile communication terminal 10 is connected to the second communication network and the 3D multi-view display mode is available. In addition, a viewpoint switch request signal and/or a viewpoint selection signal may be input by means of the object for viewpoint switching, which is changed in shape and activated as well due to connection to the second communication network. For example, if the user touches the object and then moves the touch, the viewpoint switch request signal and/or the viewpoint selection signal may be input according to the touch movement, or a 3D multi-view image corresponding to a changed viewpoint may be displayed as a main image in preview mode.

As the object is changed from a 2D figure to a 3D figure, the user is aware that a 3D multi-view image can be viewed. The user may input the viewpoint switch request signal or the viewpoint selection signal by touching the 3D figure and rotating the touch.

In accordance with the embodiment of the present invention illustrated in FIG. 21, the object for viewpoint switching is provided in the form of an icon. The icon may be a 2D figure in the first communication network environment and may be changed to a 3D figure in the second communication network environment. Or the icon may be deactivated in the first communication network environment and may be activated in the second communication network environment. Activation of the icon refers to a state in which the user can input a user signal by touching or clicking on the icon and a control signal can be generated according to the user signal. Or the icon may be displayed transparent or semi-transparent in the first communication network environment and may become opaque as the mobile communication terminal 10 is connected to the second communication network. In this manner, the user can be readily aware that the mobile communication terminal 10 is connected to the second communication network.

Figure 22:
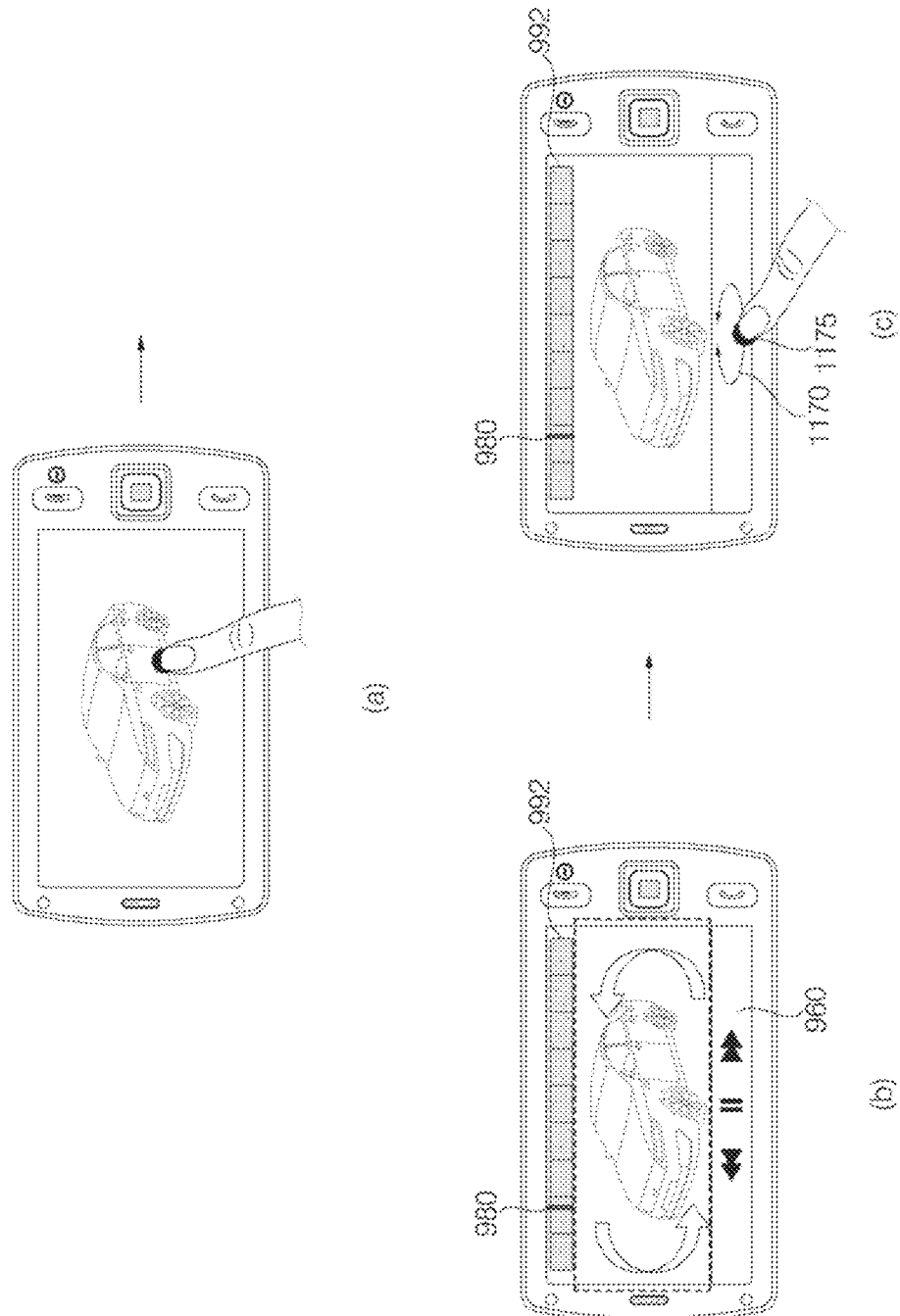

FIG. 22 illustrates an exemplary method for activating a control screen during image reproduction.

When the user touches the display 151 during reproduction of a 3D multi-view image, a UI for screen control may be displayed. That is, the controller 180 may recognize a user touch that is input during image reproduction as a user command requesting a UI and thus may generate and output the UI for screen control.

Referring to FIG. 22(*a*), a user touch is input in a predetermined manner, for displaying a UI. The user touch may be predefined by the duration of a touch, a double tab, etc. A UI that can be displayed according to the input user touch may be used for image reproduction-related functions and/or viewpoint control, as illustrated in FIG. 22(*b*) or FIG. 23(*c*).

Referring to FIG. 22(*b*), upon receipt of the user touch input, the mobile communication terminal 10 may display a UI 960 for selecting pause, rewind, fast forward, etc. for an image and an arrowed object overlapped on a displayed image, for viewpoint switching.

According to the embodiment of the present invention illustrated in FIG. 22(*c*), an arrowed object 1170 for viewpoint control may be displayed separately in a lower part of the screen. A current viewpoint 1175 may be indicated by a point on the arrowed object 1170 directed along a rotation direction. The user may control a viewpoint by moving a touch on the arrowed object 1170, referring to the current viewpoint 1175 indicated on the arrowed object 1170.

Figure 23:
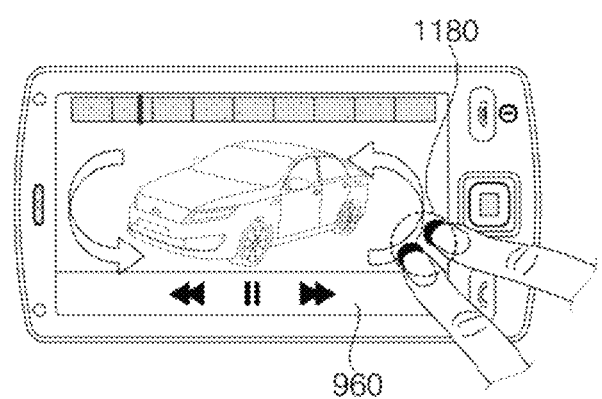

FIG. 23 illustrates an exemplary method for inputting a user touch for viewpoint control.

For example, one event of a touch on one spot by a finger or a touch pen may be referred to as a single touch and one event of simultaneous touches on two or more spots by two or more fingers or touch pens may be referred to as a multi-touch. A single touch is used for typical control of an image or a mobile communication terminal. Therefore, a multi-touch may be made to control a viewpoint for 3D multi-view display, distinguishably from the conventional touch input.

When two or more spots are touched and moved, the display 151 and the controller 180 may recognize the multi-touch as a user signal requesting viewpoint switching and thus may switch from the viewpoint of an image displayed on the screen to another viewpoint. That is, the user may change a viewpoint by rotating a multi-touch on the screen in a plurality of directions and preview 3D multi-view images corresponding to the changed viewpoints, so that a 3D multi-view image corresponding to a selected viewpoint may be displayed.

Figure 24:
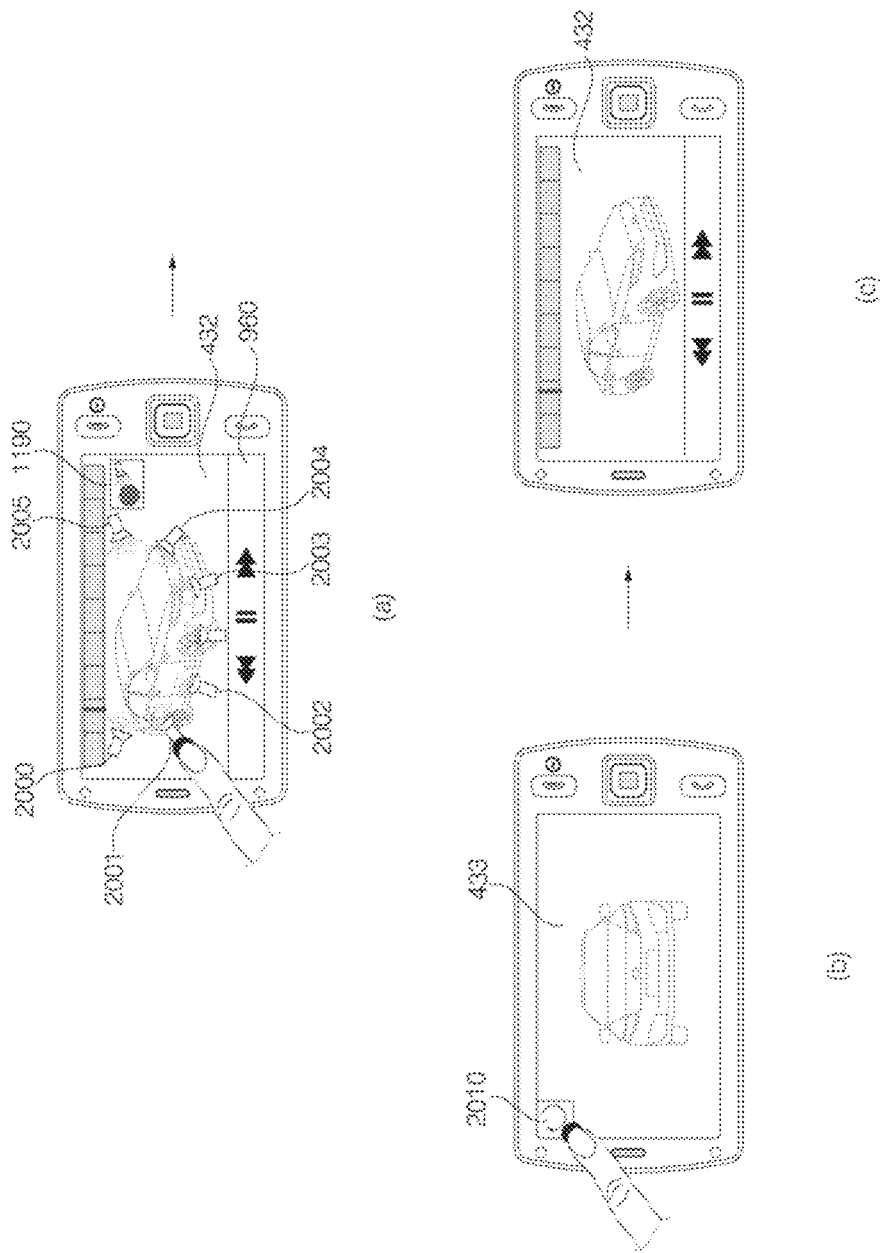
Figure 25:
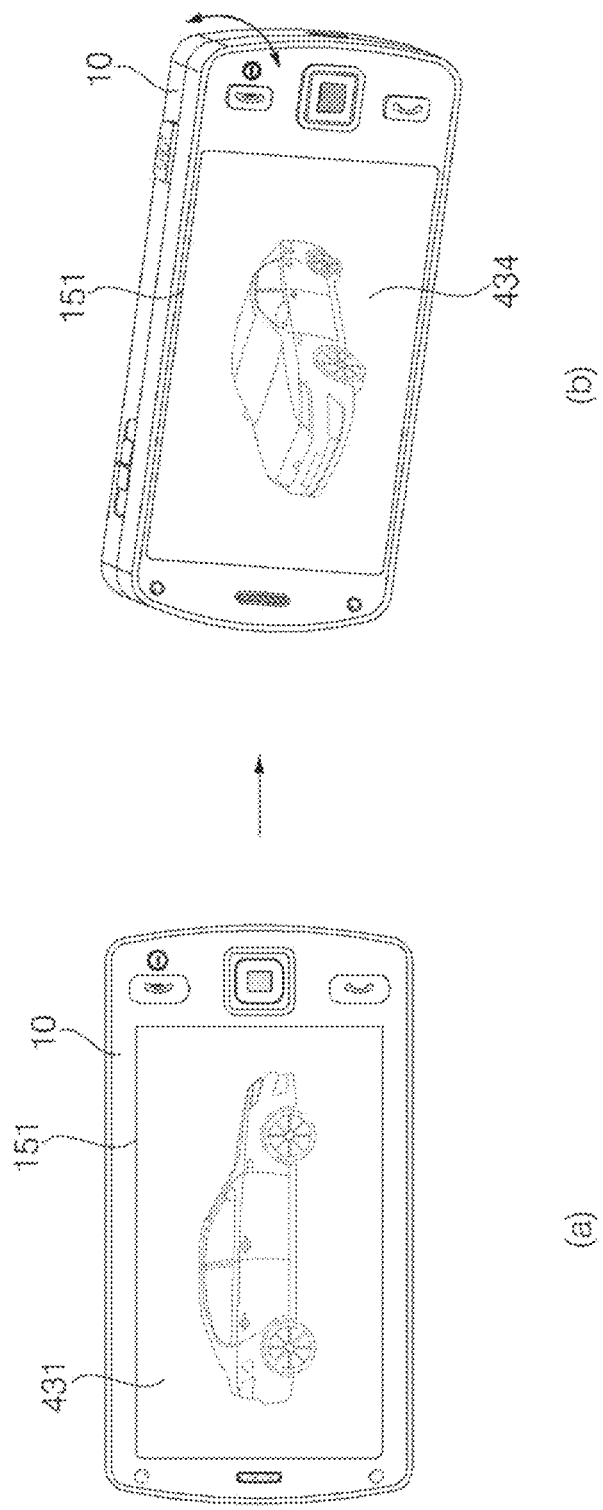

FIGS. 24 and 25 illustrate operations for changing the viewpoint of a 3D multi-view image according to embodiments of the present invention.

FIG. 24(*a*) illustrates the display 151 in the mobile communication terminal 10 that has been placed in the viewpoint switch mode according to a viewpoint switch request signal received from a user. An exemplary viewpoint menu screen is displayed to allow the user to select various viewpoints, when a 3D multi-view image is reproduced. Cameras directed at different angles are overlapped on the reproduced image.

According to an embodiment of the present invention, upon receipt of a viewpoint switch request signal from the user, the mobile communication terminal 10 temporarily discontinues image reproduction and enters the viewpoint switch mode. In the viewpoint switch mode, a UI or an object for viewpoint switching is displayed. The user may input a viewpoint switch request signal or a viewpoint selection signal using the UI or the object.

In FIG. 24(*a*), cameras or arrowed icons that represent viewpoints may be overlapped on a displayed image, as objects for viewpoint switching. When the user selects one of the icons, an image viewed from an angle corresponding to the selected icon is displayed on the screen.

That is, icons 2001 to 2005 corresponding to first to fifth viewpoints are displayed on the screen. When the user touches one of the icons 2001 to 2005, the touch is recognized as a viewpoint selection signal and the viewpoint corresponding to the icon is selected.

A viewpoint guide image 1190 indicating a current viewpoint may further be displayed as a reference for viewpoint selection. There may be a default viewpoint for a 3D multi-view image. In this case, a default viewpoint icon 2000 may be displayed additionally.

After viewpoint switching, a signal requesting recovery to the previous viewpoint may be input. This signal will be referred to as a viewpoint recovery signal. Referring to FIG. 24(*c*), a viewpoint recovery icon 2010 may be displayed temporarily or continuously according to user selection or setting of the mobile communication terminal 10 on a screen displayed according to the changed viewpoint in order to allow the user to input the viewpoint recovery signal. When the user inputs the viewpoint recovery signal by touching the viewpoint recovery icon 2010, an image displayed before the viewpoint switching appears again. That is, upon receipt of the viewpoint recovery signal, the 3D multi-view image corresponding to the previous viewpoint before the input of the viewpoint switch request and the viewpoint selection signal is displayed again. The viewpoint recovery icon 2010 is purely exemplary and thus it is to be understood that the viewpoint recovery signal can be input in various manners.

FIG. 24(c) illustrates recovery of a 3D multi-view image corresponding to a previous viewpoint, after viewpoint switching and input of a viewpoint recovery signal.

Figure 26:
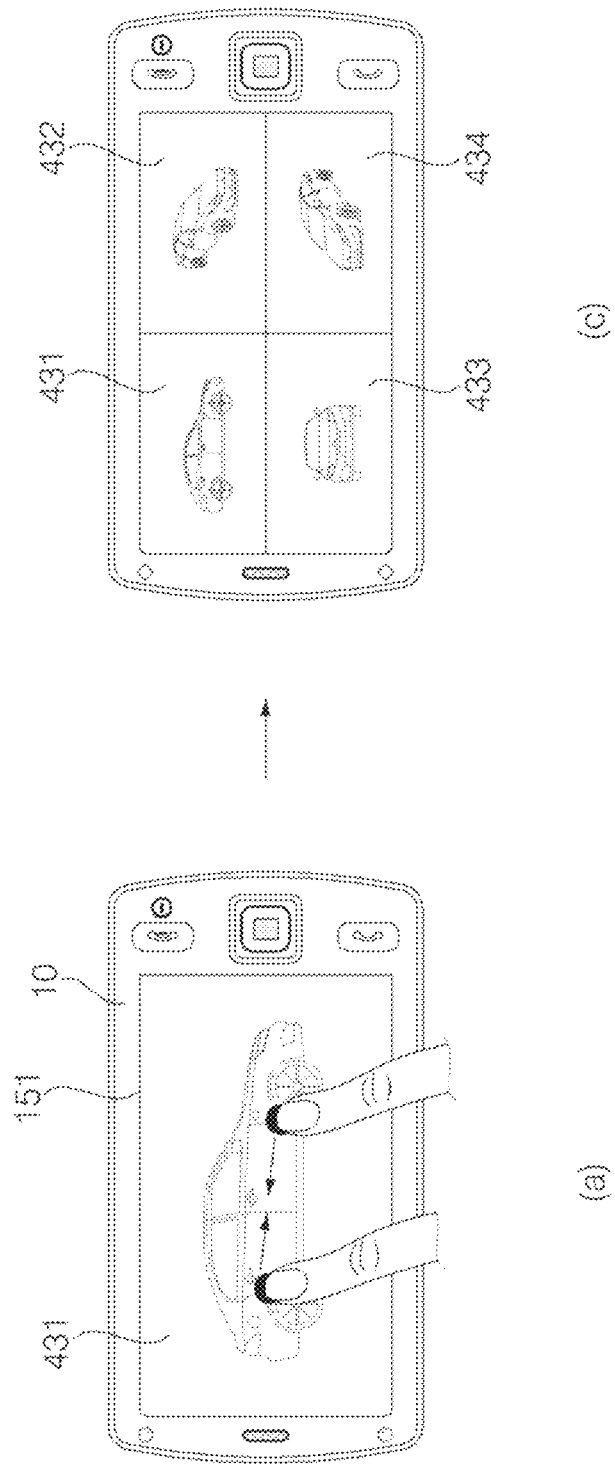

FIGS. 25 and 26 illustrate methods for changing the viewpoint of a 3D multi-vie image.

FIG. 25 illustrates viewpoint switching by inclining the body of the mobile communication terminal 10. The controller 180 may identify a relative inclination of the body of the mobile communication terminal 10 by monitoring the position or glance of the user using a camera or a position sensor or may identify the posture or inclination of the body of the mobile communication terminal 10 using a gyro sensor. Or the controller 180 may recognize a later inclination of the body of the mobile communication terminal 10 as a viewpoint switch request signal, using the angle or position of the body of the mobile communication terminal 10 at the moment a 3D multi-view image starts to be reproduced, as a reference.

For example, when the user views the display 151 from the front, the mobile communication terminal 10 may display the front of an object. When the user inclines the body of the mobile communication terminal 10 and views a side of the mobile communication terminal 10, the mobile communication terminal 10 may display a side of the object.

The controller 180 may detect a user-requested viewpoint based on a position relationship with the user or an angle sensed by the gyro sensor, process a 3D multi-view image according to the detected viewpoint, and display the 3D multi-view image on the display 151.

FIG. 26 illustrates simultaneous display of a plurality of 3D multi-view images viewed from different viewpoints. If the user pinches out a screen during reproduction of a 3D single-view image or a 3D multi-view image viewed from a viewpoint, the controller 180 may recognize the pinch-out as a multi-view request signal. Then the controller 180 may process all of a plurality of 3D multi-view images viewed from different viewpoints and output them to the display 151 so that the display 151 may display them simultaneously in divided screens.

The user may input a viewpoint switch request signal before pinching out a 3D multi-view image and the mobile communication terminal 10 may enter the viewpoint switch mode according to the user's viewpoint switch request.

Figure 27:
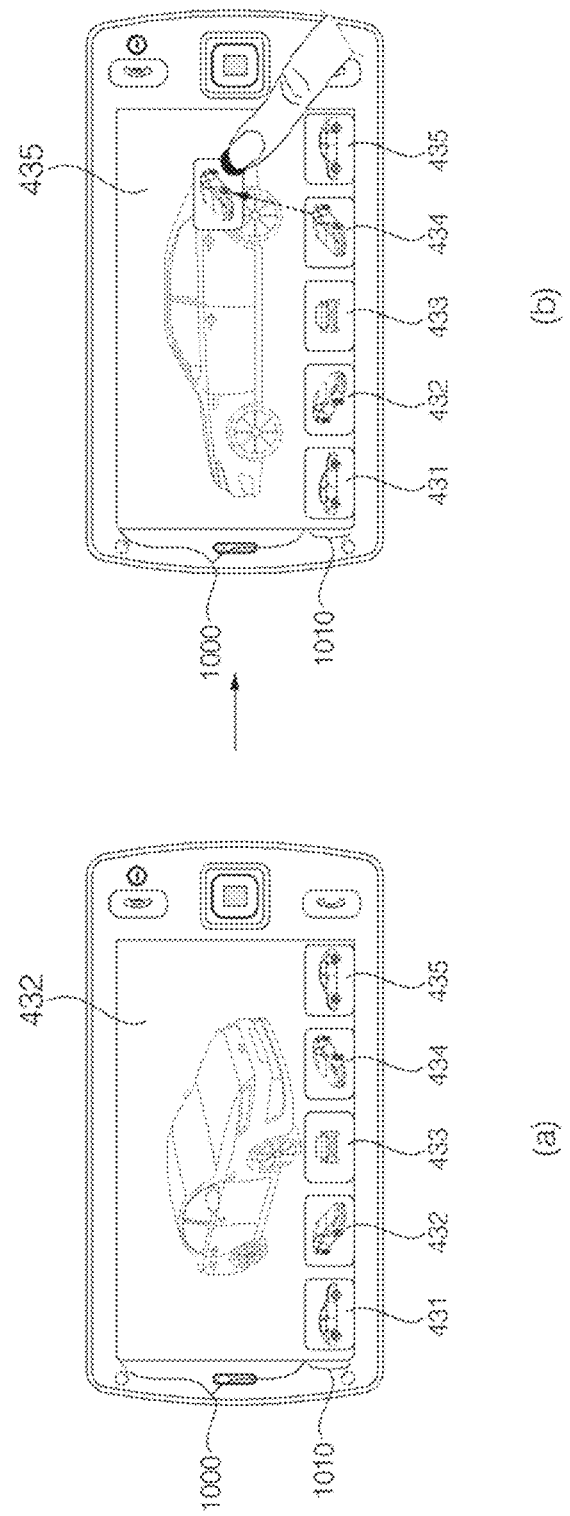

According to the embodiment of the present invention illustrated in FIG. 27, per-viewpoint-based thumbnail images of 3D multi-view images are provided.

During 3D multi-view reproduction, the screen may be divided into the first and second areas 1000 and 1010. A 3D multi-view image viewed from a viewpoint may be displayed as a main image in the first area 1000, whereas 3D multi-view images viewed from different viewpoints may be displayed as thumbnails in the second area 1010.

That is, when 3D multi-view images are reproduced, images viewed from different viewpoints may be displayed together in thumbnails or sub-images. The main image is displayed in the first area 1000, whereas the sub-images or thumbnails images are displayed in the second area 1010. The thumbnail images are created by separately processing image signals corresponding to different viewpoints received through the wireless communication module 110. The sub-images may refer to images that are reproduced simultaneously with the main image but in a relatively small size.

Referring to FIG. 27(a), a 3D multi-view image 432 viewed from a second viewpoint may be displayed as a main image in the first area 1000, whereas a 3D multi-view image 431 viewed from a first viewpoint, the 3D multi-view image 432 viewed from the second viewpoint, a 3D multi-view image 433 viewed from a third viewpoint, a 3D multi-view image 434 viewed from a fourth viewpoint, and a 3D multi-view image 435 viewed from a fifth viewpoint may be displayed as thumbnails or sub-images in the second area 1010.

Referring to FIG. 27(b), the user may change the viewpoint of the reproduced 3D multi-view image by selecting one of the thumbnail images 431 to 435. For example, the user may input a viewpoint selection signal selecting the fifth viewpoint by dragging the 3D multi-view image 435 viewed from the fifth viewpoint and dropping it in the first area 1000. Accordingly, the 3D multi-view image 432 viewed from the second viewpoint is replaced with the 3D multi-view image 435 viewed from the fifth viewpoint as the main image in the first area 1000.

Figure 28:
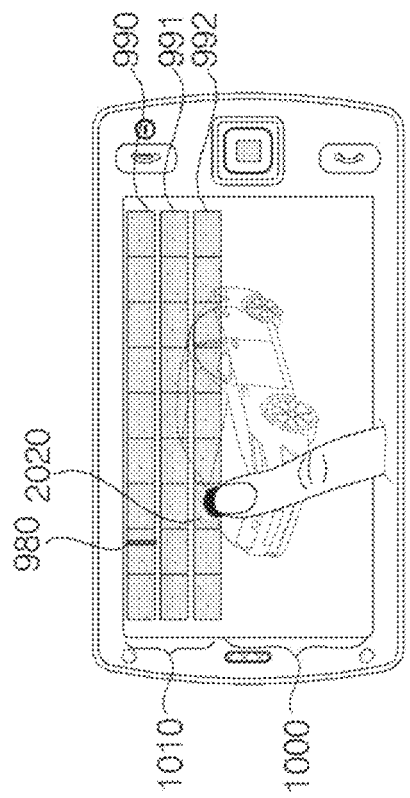

Referring to FIG. 28, the first, second and third progress bars 990, 991 and 992 having thumbnail images arranged on the time line are displayed in the second area 1010.

The first progress bar 990 may be for 2D images, the second progress bar 991 may be for 3D single-view images, and the third progress bar 992 may be for 3D multi-view images. Or the first progress bar 990 may be for 3D multi-view images taken from a first viewpoint, the second progress bar 991 may be for 3D multi-view images taken from a second viewpoint, and the third progress bar 992 may be for 3D multi-view images taken from a third viewpoint.

Thus, the user may select a specific thumbnail image from a progress bar, thereby selecting a display mode and a viewpoint at once. In FIG. 28, the user may simultaneously change a reproduction time and a display mode, or a reproduction time and a viewpoint for a 3D multi-view image by touching a thumbnail 2020 representing an intended reproduction time and display mode or an intended reproduction time and viewpoint for a 3D multi-view image.

Figure 29:
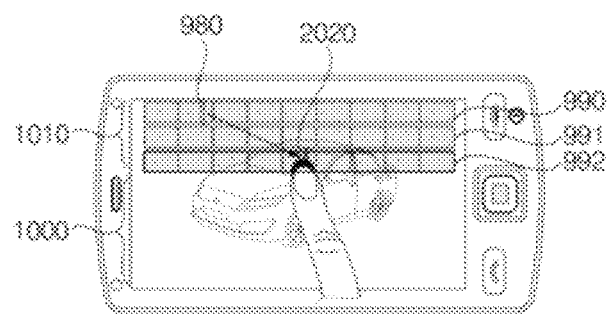

Referring to FIG. 29, the first, second and third progress bars 990, 991 and 992 are displayed and the cursor 980 is located on a position corresponding to a current display mode and viewpoint and a reproduction time, in the second area 1010, as in FIG. 28. The user may simultaneously change the reproduction time and display mode or the reproduction time and viewpoint for a 3D multi-view image by touching and moving the cursor 980. For example, the user may change the display mode, viewpoint, and reproduction time at one time by dragging and dropping the cursor 980 to the position of the thumbnail image 2020 corresponding to an intended display mode, viewpoint, and reproduction time.

Figure 30:
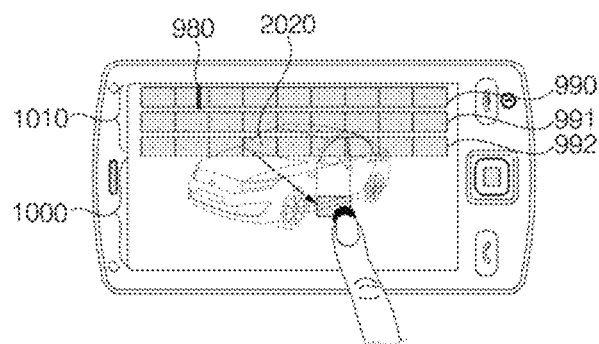

Referring to FIG. 30, the user may change the reproduction time and display mode, or the reproduction time and viewpoint for a 3D multi-view image by dragging and dropping the thumbnail image 2020 corresponding to an intended reproduction time and display mode, or intended reproduction time and viewpoint for a 3D multi-view image to the first area 1000.

Figure 31:
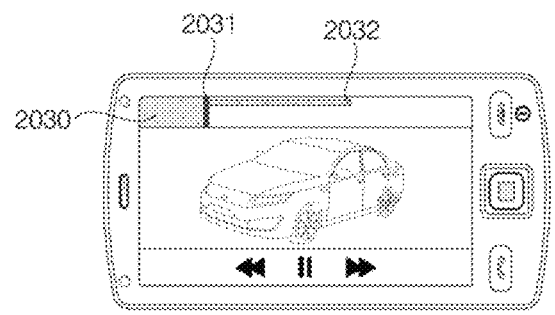
Figure 32:
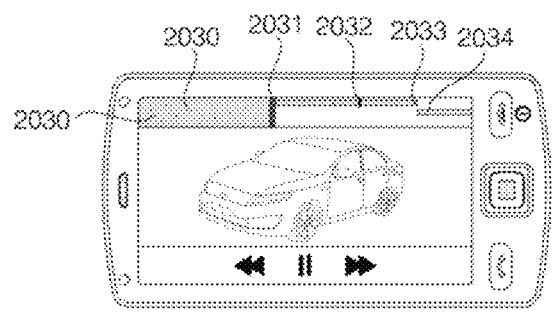

With reference to FIGS. 31, 32 and 33, a description will be given of an embodiment of the present invention in which the mobile communication terminal 10 receives 3D multi-view images from the second communication network by streaming and reproduces the received 3D multi-view images. In the embodiment of the present invention illustrated in FIGS. 31, 32 and 33, the mobile communication terminal is disconnected from the second mobile communication network and instead, is connected to the first communication network, while the mobile communication network 10 is receiving 3D multi-view images by streaming.

Referring to FIG. 31, a progress bar 2030 indicates a current reproduction time with respect to the total amount of 3D multi-view images to be reproduced using a cursor 2031. A buffering progress bar indicates the amount 2033 of buffered images at a current time.

While the mobile communication terminal 10 is connected to the second communication network, it stores 3D multi-view images in advance. The stored 3D multi-view images are a part yet to be reproduced after the current reproduction time. That is, the mobile communication terminal 10 pre-stores images following the current reproduction time in preparation for the case where it is disconnected from the second communication network.

Referring to FIG. 32, if the mobile communication terminal 10 is disconnected from the second communication network a certain time later, the progress bar 2030 and cursor 2031 indicating the current reproduction time, and the amount 2033 of pre-buffered 3D multi-view images following the current reproduction time are displayed. When the mobile communication terminal 10 is disconnected from the second communication terminal, the pre-buffered 3D multi-view images are reproduced. When the pre-buffered 3D multi-view images are completely reproduced, a remainder to be reproduced is received in 2D images and the 2D images are reproduced by streaming.

In this case, even though the mobile communication terminal 10 is disconnected from the second communication network during streaming of 3D multi-view images, displaying the 3D multi-view images is not terminated immediately. Rather, the pre-stored subsequent part is reproduced, thereby maximizing the amount of images reproduced in the 3D multi-view display mode. Therefore, the time of reproducing a remaining part following the reproduced 3D multi-view images in 2D images can be delayed as long as possible.

Referring to FIG. 33, when the mobile communication terminal 10 is disconnected from the second communication network, the mobile communication terminal 10 may generate and output options available to the user in the first communication network as a pop-up window or menu image 2040. That is, the controller 180 generates the pop-up window or menu image 2040 in which the user may select subsequent streaming of 2D images instead of 3D multi-view images, subsequent streaming of 3D single-view images, or downloading of 3D multi-view images corresponding to a remaining part through the first communication network despite a low speed and viewing the downloaded remaining part, and displays the pop-up window or menu image 204 on the display 151.

When it gets difficult for the user to receive 3D multi-view images and view them by streaming through the second communication network any longer, the user may view as many 3D multi-view images as pre-stored. Upon completion of reproduction of the pre-stored 3D multi-view images, the user is allowed to select a display mode for the following images to be reproduced.

FIG. 34 illustrates an exemplary format of a data packet of a 3D multi-view image or a 3D multi-view image response signal. However, the formats of a 3D multi-view image request signal, a server's response signal to a display mode switch request signal, and a 3D multi-view image are not limited to those illustrated in FIG. 34 which do not limit the scope of the present invention.

Herein, the format of a 3D multi-view image data packet including a 3D multi-view image response signal is taken as an example. The 3D multi-view image data packet may indicate whether a display mode has been switched by a header 2110. For example, if the header 2110 is set to 0, this means an unchanged display mode. If the header 2110 is set to 1, this means switching from a previous display mode. The mobile communication terminal 10 may expect to receive 3D multi-view data from the value of the header field and thus may set the multimedia player 181 according to the switched display mode. Since the controller 180 already has information about the display mode of the previous received image and a user-requested display mode, it may determine the type of image data to be received later, that is, the display mode of images to be received, simply from 0 or 1 in the header 2110.

A data field 2120 may carry actual image data. The other fields include a receiver address field 2130 specifying the address of a receiving terminal to receive the image data, a sender address field 2140 specifying the address of a sending server or terminal, a timing information field 2159 carrying information about the transmission timing of the image data, and a field 2160 carrying other packet information such as Uniform Resource Locator (URL) information, port information, etc.

FIG. 34(*a*) illustrates a data packet carrying a 3D multi-view image, when a display mode is switched. Since the display mode is switched according to a display mode switch request and thus the 3D multi-view image is transmitted, the header 2110 is set to 1 to indicate display mode switching. The mobile communication terminal 10 may determine from the value of the header field that data to be received is a 3D multi-view image.

FIG. 34(*b*) illustrates a data packet carrying a 3D single-view image without display mode switching. Since the display mode has not been switched, the header 2110 is set to 0.

FIG. 34(*c*) illustrates a data packet carrying a 3D single-view image through display mode switching. To indicate display mode switching, the header 2110 is set to 1 and an actual transmitted image is a 3D single-view image. Thus, it can be determined that a 3D multi-view image or a 2D image was transmitted before the display mode switching. For example, when the network environment gets poor, the battery power drops to or below a reference value, or the user requests display mode switching during 3D multi-view reproduction, subsequent image data to be reproduced may have the format illustrated in FIG. 34(*c*).

FIG. 34(*d*) illustrates a data packet carrying a 2D image, when display mode switching is failed and thus 2D images are continuously transmitted. The header 2110 is set to 0 and the data field 2120 contains a 2D image.

FIG. 34(*e*) illustrates a data packet carrying a 2D image through display mode switching. When a display mode is changed to the 2D display mode due to a poor network environment or a lack in memory capacity or battery power, a data packet having the format illustrated in FIG. 34(*e*) may be transmitted.

As is apparent from the above description, when a user views 3D images through a mobile communication terminal, the present invention can provide images viewed from various viewpoints to the user. In a network environment that enables fast transmission of a large amount of data, the user is notified of this network environment and is given a wide range of options. In addition, as 3D images viewed from various viewpoints are provided, the functions of the mobile communication terminal as a multimedia device can be enhanced. In addition to provisioning of 3D multi-view images, user convenience can be increased in viewpoint switching and selection.

The mobile communication terminal and the method for operating the same according to the foregoing exemplary embodiments are not restricted to the exemplary embodiments set forth herein. Therefore, variations and combinations of the exemplary embodiments set forth herein may fall within the scope of the present invention.

The present invention may be implemented as code that can be written on a computer-readable recording medium and thus read by a processor in a mobile communication terminal. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims

What is claimed is:

1. A method for operating a mobile communication terminal, the method comprising:
reproducing a two-dimensional (2D) image or a three-dimensional (3D) single-view image on a display of the mobile communication terminal, the 3D single-view image comprising a 3D image viewed from one viewpoint;
receiving a display mode switch request via a user input unit of the mobile communication terminal while the 2D image or the 3D single-view image is reproduced;
determining, via a controller of the mobile communication terminal, whether 3D multi-view image reception is available in response to the received display mode switch request, wherein the determination is based on an environment of a mobile communication network to which a wireless communication unit of the mobile communication terminal is connected;
receiving, via the wireless communication unit, 3D multi-view images from an external server and displaying the received 3D multi-view images on the display when the 3D multi-view image reception is available, the 3D multi-view images comprising 3D images viewed from two or more viewpoints;
displaying on the display two or more per-viewpoint-based thumbnail images of the 3D multi-view images,
wherein each of the two or more per-viewpoint-based thumbnail images corresponds to a same object viewed from a different viewpoint,
wherein the 3D multi-view images are displayed on a first area of a screen of the display, and
wherein the two or more per-viewpoint-based thumbnail images are displayed on a second area of the screen separate from the first area of the screen; and
receiving the 2D image or the 3D single-view image, via the wireless communication unit, from the external server and continuing the reproducing of the 2D image or 3D single-view image on the display when the 3D multi-view image reception is not available.

2. The method of claim 1, further comprising:
connecting the wireless communication unit to a first communication network and a second communication network,
wherein the first communication network comprises a non-Long Term Evolution (LTE) network,
wherein the second communication network comprises an LTE network,
wherein the 2D image or the 3D single-view image is received via the first communication network, and
wherein the 3D multi-view images are received via the second communication network.

3. The method of claim 2, wherein receiving the 3D multi-view images comprises:
receiving content source information corresponding to the 2D image or the 3D single-view image via the first communication network; and
receiving the 3D multi-view images having the same content source information as the 2D image or the 3D single-view image via the second communication network.

4. The method of claim 2, wherein a Packet Data Network (PDN) to which the first communication network is connected for receiving the 2D image or the 3D single-view image is identical to a PDN to which the second communication network is connected for receiving the 3D multi-view images.

5. The method of claim 1, wherein:
determining whether the 3D multi-view image reception is available comprises determining that the 3D multi-view image reception is available when a network state value is within a predetermined range;
the network state value comprises quantified information about the environment of the mobile communication network to which the wireless communication unit is connected; and
the network state value is determined based on a state of a channel established for data transmission and reception for the wireless communication unit, a data transmission rate, a system load, or real-time traffic information.

6. The method according to claim 1, wherein determining whether the 3D multi-view image reception is available comprises:
determining that the 3D multi-view image reception is available when the wireless communication unit is connected to a second communication network comprising a Long Term Evolution (LTE) network, or when receipt of the 3D multi-view images within a predetermined time through one of the second communication network or a first communication network comprising a non-LTE network is available; and
determining that the 3D multi-view image reception is not available when the wireless communication unit is connected to the first communication network, or when receipt of the 3D multi-view images within the predetermined time through either the first communication network or the second communication network is not available.

7. A mobile communication terminal, comprising:
a wireless communication unit configured to receive image data from an external server;
a display configured to reproduce at least a two-dimensional (2D) image, a three-dimensional (3D) single-view image or a 3D multi-view images;
a user input unit configured to receive a display mode switch request; and a controller configured to:
  determine whether 3D multi-view image reception is available in response to the display mode switch request received while the 2D image or the 3D single-view image is displayed, wherein the determination is based on an environment of a mobile communication network to which the wireless communication unit is connected;
  cause the wireless communication unit to receive 3D multi-view images, and cause the display to display the received 3D multi-view images when the 3D multi-view image reception is available;
  cause the display to display two or more per-viewpoint-based thumbnail images of the 3D multi-view images, wherein each of the two or more per-viewpoint-based thumbnail images corresponds to a same object viewed from a different viewpoint,
  wherein the 3D multi-view images are displayed on a first area of a screen of the display, and
  wherein the two or more per-viewpoint-based thumbnail images are displayed on a second area of the screen separate from the first area of the screen; and
  cause the wireless communication unit to receive the 2D image or the 3D single-view image, and cause the display to display the received 2D image or 3D single-view image when the 3D multi-view image reception is not available.

8. The mobile communication terminal of claim 7, wherein determining whether the 3D multi-view image reception is available comprises:
  determining that the 3D multi-view image reception is available when the wireless communication unit is connected to a second communication network comprising a Long Term Evolution (LTE) network, or when receipt of the 3D multi-view images within a predetermined time through one of the second communication network or a first communication network comprising a non-LTE network is available, or when a network state value is within a predetermined range, wherein the network state value comprises quantified information about the environment of the mobile communication network to which the wireless communication unit is connected and is determined based on a state of a channel established for data transmission and reception for the wireless communication unit, a data transmission rate, a system load, or real-time traffic information; and
  determining that the 3D multi-view image reception is not available when the wireless communication unit is connected to the first communication network, or when receipt of the 3D multi-view images within the predetermined time through either the first communication network or the second communication network is not available.

9. The mobile communication terminal of claim 7, wherein:
  the wireless communication unit is further configured to connect to a first communication network comprising a non-Long Term Evolution (LTE) network and a second communication network comprising an LTE network;
  the 2D image or the 3D single-view image is received via the first communication network;
  the 3D multi-view images are received via the second communication network; and
  receiving the 3D multi-view images comprises:
    receiving content source information corresponding to the 2D image or the 3D single-view image via the first communication network; and
    receiving the 3D multi-view images having the same content source information as the 2D image or the 3D single-view image via the second communication network.

10. The mobile communication terminal of claim 7, further comprising:
  a power supply including at least one battery,
  wherein the controller is further configured to:
    cause the display to change a display mode of the display when a remaining battery power is decreased to or below a predetermined value during reproduction of the 3D multi-view images;
    cause the display to cease displaying the 3D multi-view images in response to the changed display mode; and
    cause the display to display the 2D image or the 3D single-view image in response to the changed display mode.

11. A method for operating a mobile communication terminal capable of connecting to a first communication network and a second communication network, the method comprising:
  receiving, via a wireless communication unit of the mobile communication terminal, a two-dimensional (2D) image or a three-dimensional (3D) single-view image from an external server via the first communication network or the second communication network, wherein the 3D single-view image comprises a 3D image viewed from one viewpoint;
  receiving, via the wireless communication unit, 3D multi-view images from the external server via the second communication network, wherein the 3D multi-view images comprise 3D images viewed from two or more viewpoints, wherein the first communication network comprises a non-Long Term Evolution (LTE) network, and wherein the second communication network comprises an LTE network;
  receiving a display mode selection via a user input unit of the mobile communication terminal, wherein a display mode is selected from among a 2D display mode, a 3D single-view display mode, and a 3D multi-view display mode;
  displaying on a display of the mobile communication terminal the 2D image, the 3D single-view image, or the 3D multi-view images based on the received display mode selection; and
  displaying on the display two or more per-viewpoint-based thumbnail images of the 3D multi-view images,
  wherein each of the two or more per-viewpoint-based thumbnail images corresponds to a same object viewed from a different viewpoint,
  wherein the 3D multi-view images are displayed on a first area of a screen of the display, and
  wherein the two or more per-viewpoint-based thumbnail images are displayed on a second area of the screen separate from the first area of the screen.

12. The method of claim 11, further comprising:
  displaying on the display a menu screen for receiving the display mode selection when the wireless communication unit is connected to the second communication network,
  wherein the received display mode selection corresponds to the 2D image, the 3D single-view image, or the 3D multi-view images.

13. The method of claim 11, further comprising:
  displaying on the display a 3D multi-view notification signal representing that a display mode for displaying the 3D multi-view images is available when the wireless communication unit is connected to the second communication network.

14. The method of claim 11, further comprising:
displaying on the display a plurality of progress bars representing buffering states of the 2D image, the 3D single-view image, and the 3D multi-view images while the 2D image, the 3D single-view image, or the 3D multi-view images is displayed on the display.

15. The method of claim 11, further comprising:
receiving a viewpoint switch request, via the user input unit, while a first one of the 3D multi-view images is displayed on the display;
displaying on the display a multi-view menu for receiving input of a viewpoint selection;
receiving the input of the viewpoint selection via the displayed multi-view menu; and
displaying on the display a second one of the 3D multi-view images based on a viewpoint corresponding to the received viewpoint selection input.

16. The method of claim 15, wherein the 3D multi-view images are from a video, the method further comprising:
temporarily ceasing reproduction of the video on the display upon receipt of the viewpoint switch request.

17. The method of claim 15, further comprising:
receiving a viewpoint recovery request via the user input unit; and
re-displaying on the display the first one of the 3D multi-view images based on a viewpoint displayed previous to the reception of the viewpoint switch request.

18. The method of claim 15, wherein:
the multi-view menu comprises a menu item for receiving a selection of the 2D display mode for displaying the 2D image, a menu item for receiving a selection of the 3D single-view display mode for displaying the 3D single-view image, and a menu item for receiving a selection of the 3D multi-view display mode for displaying the 3D multi-view images; and
the menu item for receiving the selection of the 3D multi-view display mode is deactivated when the wireless communication unit is disconnected from the second communication network.

19. The method of claim 11, wherein the mobile communication terminal comprises a first antenna and a second antenna, the method further comprising:
connecting the wireless communication unit to the first communication network via the first antenna; and
connecting the wireless communication unit to the second communication network via the second antenna,
wherein the 2D image and the 3D single-view image are received via the first communication network.

20. The method of claim 11, wherein the mobile communication terminal comprises a first antenna and a second antenna, the method further comprising:
connecting the wireless communication unit to the first communication network via the first antenna; and
connecting the wireless communication unit to the second communication network via the second antenna; and
receiving thumbnail images of the 3D multi-view images via the first communication network.

21. The method of claim 11, further comprising:
displaying on the display two or more per-viewpoint-based thumbnail images of the 3D multi-view images when the 3D multi-view images are displayed,
wherein each of the two or more per-viewpoint-based thumbnail images corresponds to a same object viewed from a different viewpoint,
wherein the 3D multi-view images are displayed on a first area of a screen of the display, and
wherein the two or more per-viewpoint-based thumbnail images are displayed on a second area of the screen separate from the first area of the screen.

22. The method of claim 21, further comprising:
receiving a viewpoint selection corresponding to one of the two or more per-viewpoint-based thumbnail images displayed on the second area of the screen; and
displaying one of the 3D multi-view images viewed from the viewpoint corresponding to the selected per-viewpoint-based thumbnail image on the first area of the screen.

23. The method of claim 21, wherein the two or more per-viewpoint-based thumbnail images are arranged in a first direction on the second area of the screen when the 3D multi-view images are from a video, the method further comprising:
displaying on the display per-reproduction time-based thumbnail images arranged in a second direction on the second area of the screen based on reproduction time points of the video.

24. The method of claim 11, further comprising:
receiving image data comprising header information indicating whether a received image comprises the 2D image, the 3D single-view image, or the 3D multi-view images.

25. The method of claim 11, further comprising:
receiving, via the wireless communication unit, a portion of a currently reproduced 3D single-view image or 3D multi-view images to be reproduced after a current reproduction time;
storing the portion of the currently reproduced 3D single-view image or 3D multi-view images to be reproduced after the current reproduction time in a memory of the mobile communication terminal;
disconnecting the wireless communication unit from the second communication network;
reproducing on the display the stored portion of the currently reproduced 3D single-view image or 3D multi-view images upon the disconnecting of the wireless communication unit from the second communication network;
receiving, via the wireless communication unit, a portion of a 2D image or a 3D single-view image to be reproduced subsequent to the reproduction of the stored portion of the 3D single-view image or 3D multi-view images via the first communication network; and
reproducing on the display the received portion of the 2D image or the 3D single-view image to be reproduced subsequent to the reproduction of the stored portion of the 3D single-view image or 3D multi-view images.

26. A mobile communication terminal capable of connecting to a first communication network and a second communication network, the mobile communication terminal comprising:
a wireless communication unit configured to receive a two-dimensional (2D) image or a three-dimensional (3D) single-view image from an external server via the first communication network or the second communication network, and to receive 3D multi-view images from the external server via the second communication network;
a user input unit configured to receive a display mode selection to select a display mode from among a 2D display mode, a 3D single-view display mode, and a 3D multi-view display mode;

a controller configured to:
  process at least the 2D image, the 3D single-view image, or the 3D multi-view images based on the received display mode selection; and
  output a video signal corresponding to the processed 2D image, 3D single-view image, or 3D multi-view images; and
a display configured to display the processed 2D image, 3D single-view image, or 3D multi-view images based on the output video signal,
wherein the controller is further configured to cause the display to display two or more per-viewpoint-based thumbnail images of the 3D multi-view images,
wherein each of the two or more per-viewpoint-based thumbnail images corresponds to a same object viewed from a different viewpoint,
wherein the 3D multi-view images are displayed on a first area of a screen of the display,
wherein the two or more per-viewpoint-based thumbnail images are displayed on a second area of the screen separate from the first area of the screen,
wherein the first communication network comprises a non-Long Term Evolution (LTE) network,
wherein the second communication network comprises an LTE network,
wherein the 3D single-view image comprises a 3D image viewed from one viewpoint, and
wherein the 3D multi-view images comprise 3D images viewed from two or more viewpoints.

* * * * *